United States Patent
Popržen et al.

(10) Patent No.: US 12,093,153 B2
(45) Date of Patent: Sep. 17, 2024

(54) OPTIMIZING HIGH-AVAILABILITY VIRTUAL MACHINE PLACEMENTS IN ADVANCE OF A COMPUTING CLUSTER FAILURE EVENT

(71) Applicant: Nutanix, Inc., San Jose, CA (US)

(72) Inventors: Bojan Popržen, Novi Sad (RS); Danilo Medjo, Belgrade (RS); Fabien Hermenier, Grasse (FR); Karan Talreja, San Jose, CA (US); Nevena Milinković, Belgrade (RS); Nitin Chandra Badam, San Jose, CA (US); Vinaya Khandelwal, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 110 days.

(21) Appl. No.: 17/816,182

(22) Filed: Jul. 29, 2022

(65) Prior Publication Data

US 2024/0036998 A1 Feb. 1, 2024

(51) Int. Cl.
*G06F 11/00* (2006.01)
*G06F 9/455* (2018.01)
*G06F 11/20* (2006.01)

(52) U.S. Cl.
CPC ........ *G06F 11/203* (2013.01); *G06F 9/45558* (2013.01); *G06F 2009/4557* (2013.01)

(58) Field of Classification Search
CPC ............... G06F 11/203; G06F 9/45558; G06F 2009/4557
See application file for complete search history.

(56) References Cited

U.S. PATENT DOCUMENTS

| 8,095,929 B1 * | 1/2012 | Ji | G06F 9/45558 718/1 |
|---|---|---|---|
| 8,549,518 B1 | 10/2013 | Aron et al. | |
| 8,601,473 B1 | 12/2013 | Aron et al. | |

(Continued)

OTHER PUBLICATIONS

Notice of Allowance for U.S. Appl. No. 17/816,196 dated Aug. 30, 2023 [NUT-PAT-1327].

(Continued)

*Primary Examiner* — Elmira Mehrmanesh
(74) *Attorney, Agent, or Firm* — Vista IP Law Group, LLP

(57) ABSTRACT

Placement scenario optimization mechanisms for automatic placement of computing entities onto nodes of a running multi-node computing cluster. A set of failure mode parameters define a high-availability requirement of the multi-node computing cluster. In advance of a failure event, and responsive to a determination that a then-current computing entity placement does not satisfy the high-availability requirement, the cluster is analyzed and a plurality of feasible placement scenarios are generated. Optimization criteria are applied to the feasible placement scenarios such that a best choice from among the feasible placement scenarios is identified and applied to the virtual machine placements over the cluster. A change monitoring and detection facility continually observes the multi-node computing cluster to detect a change of a failure mode parameter or to detect a change to the configuration of the virtual machines. Certain of such changes cause feasible placement scenarios to be generated, evaluated, selected, and applied.

26 Claims, 15 Drawing Sheets

(56) References Cited

U.S. PATENT DOCUMENTS

| | | | |
|---|---|---|---|
| 8,850,130 | B1 | 9/2014 | Aron et al. |
| 9,772,866 | B1 | 9/2017 | Aron et al. |
| 10,552,225 | B2 | 2/2020 | Ganesan et al. |
| 10,552,272 | B2* | 2/2020 | Wang .................... G06F 11/203 |
| 10,678,579 | B2* | 6/2020 | Rivera .................. G06F 9/5072 |
| 10,866,848 | B2 | 12/2020 | Bridges et al. |
| 2015/0178120 | A1* | 6/2015 | Prasek ................ G06F 9/45558 718/1 |
| 2016/0004552 | A1* | 1/2016 | Innan .................... G06F 9/5088 718/1 |
| 2017/0147399 | A1* | 5/2017 | Cropper .............. G06F 9/45533 |
| 2017/0364387 | A1* | 12/2017 | Ahmed ................... G06F 3/067 |
| 2018/0046489 | A1* | 2/2018 | Onoue .................. G06F 9/5083 |
| 2019/0278626 | A1* | 9/2019 | Kodama ............... G06F 9/5094 |
| 2020/0174830 | A1* | 6/2020 | Hermenier ............ H04L 67/101 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Poitras, Steven. "The Nutanix Bible" (Sep. 9, 2022), from https://nutanixbible.com/ (Publication date based on indicated capture date by Archive.org; first publication date unknown).

Cano, I et al., "Curator: Self-Managing Storage for Enterprise Clusters", *14th USENIX Symposium on Networked Systems Design and Implementation, NSDI '17*, (Mar. 27, 2017).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

Marlin, J., "Failover Cluster VM Load Balancing in Windows Server 2016," Microsoft, dated Mar. 15, 2019.

"Details of the cluster overcommit algorithm in System Center 2012 R2 Virtual Machine Manager," Microsoft, dated Jan. 25, 2022.

"Taking a closer look at the Virtual Machine Manager cluster overcommit algorithm," Microsoft, dated Feb. 15, 2019, URL: https://techcommunity.microsoft.com/t5/system-center-blog/taking-a-closer-look-at-the-virtual-machine-manager-cluster/ba-p/350044.

"vSphere HA Admission Control PMem Reservation," VMWare Docs, dated Feb. 8, 2021, URL: https://docs.vmware.com/en/VMware-vSphere/7.0/com.vmware.vsphere.resmgmt.doc/GUID-6131ECC1-8E4B-4C04-AF77-52E348DF724C.html.

"vSphere Availability Guide: ESX 4.0, ESXi 4.0, vCenter Server 4.0," VMWare, copyright 2011.

"Configuring HA & Live Migration in Acropolis," NUTANIXPedia, URL: http://nutanixpedia.blogspot.com/p/configuring-ha.html, date found via Internet Archive as Nov. 27, 2021.

Harrington, S., "Solving the HA Challenge: Placement Groups for Virtual Servers," IBM, URL: https://www.ibm.com/cloud/blog/announcements/ha-challenge-placement-groups-virtual-servers, dated Oct. 4, 2018.

Reed, J., "How Hyper-V High Availability Works," Nakivo, Url: https://www.nakivo.com/blog/hyper-v-high-availability-works/, dated Dec. 11, 2022.

"VMware Infrastructure: Automating High Availability (HA) Services with VMware HA," VMWare Technical Note, Copyright 2006.

Notice of Allowance for U.S. Appl. No. 17/816,196 dated Feb. 16, 2024 [NUT-PAT-1327].

\* cited by examiner

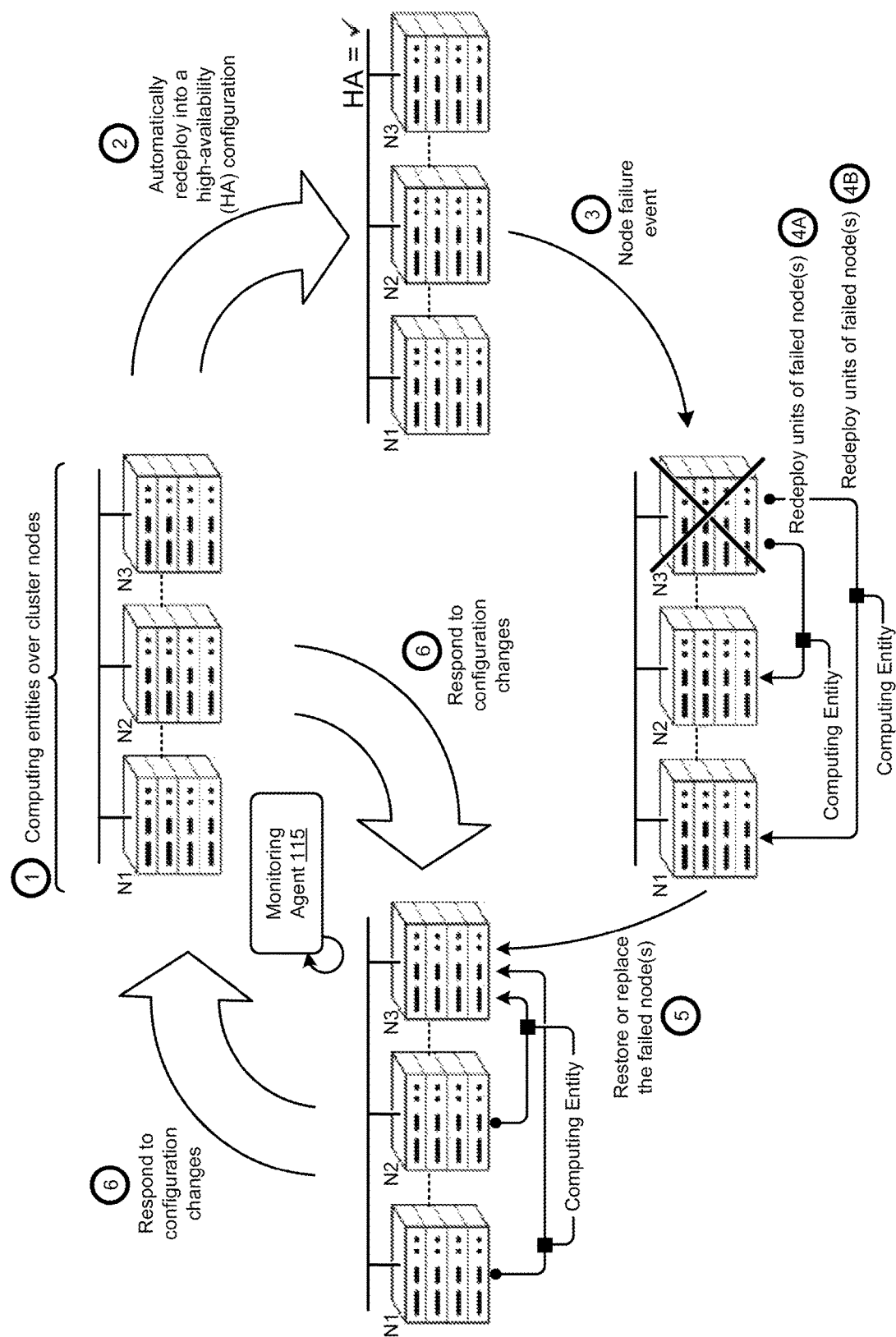
FIG. 1A1

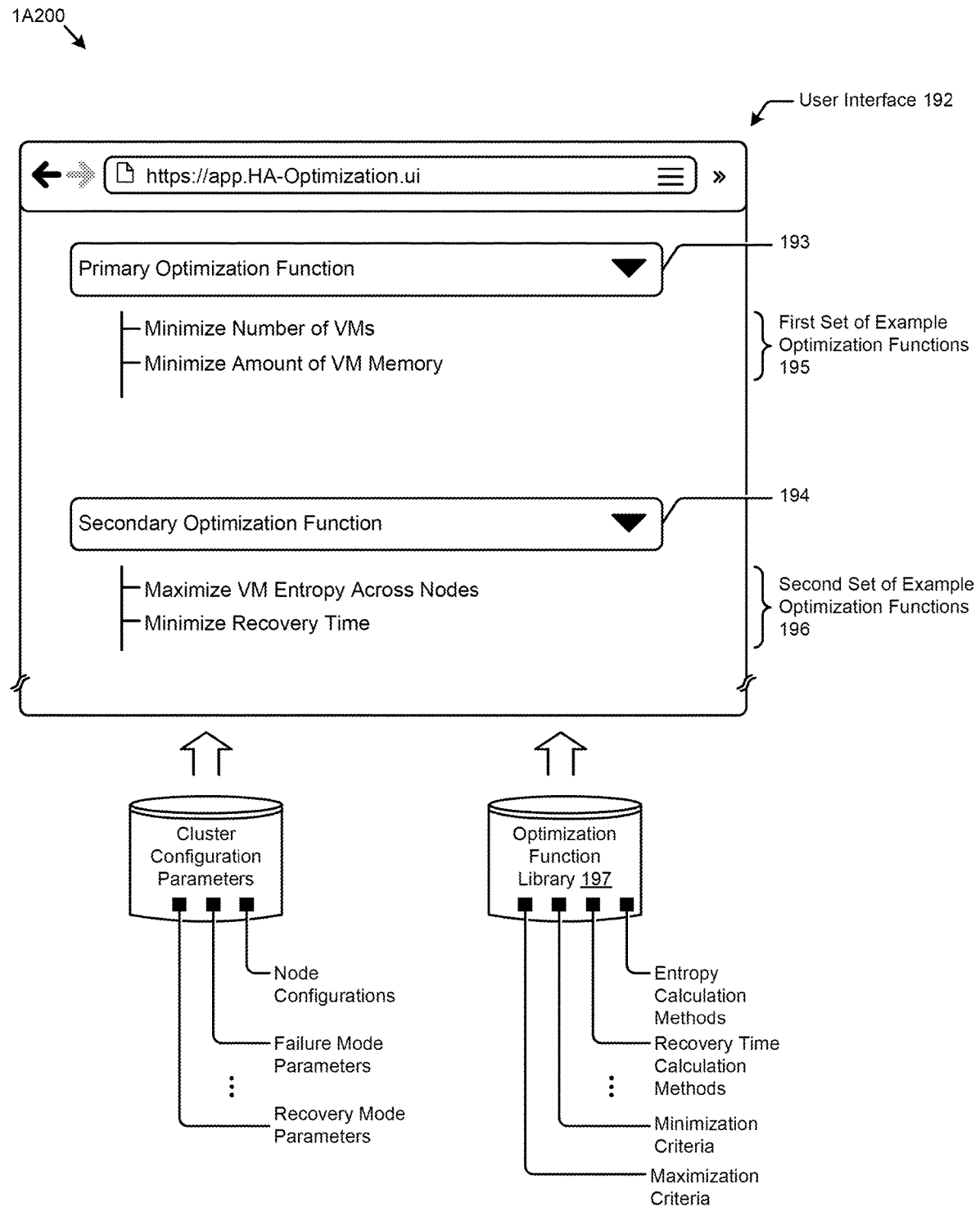
FIG. 1A2

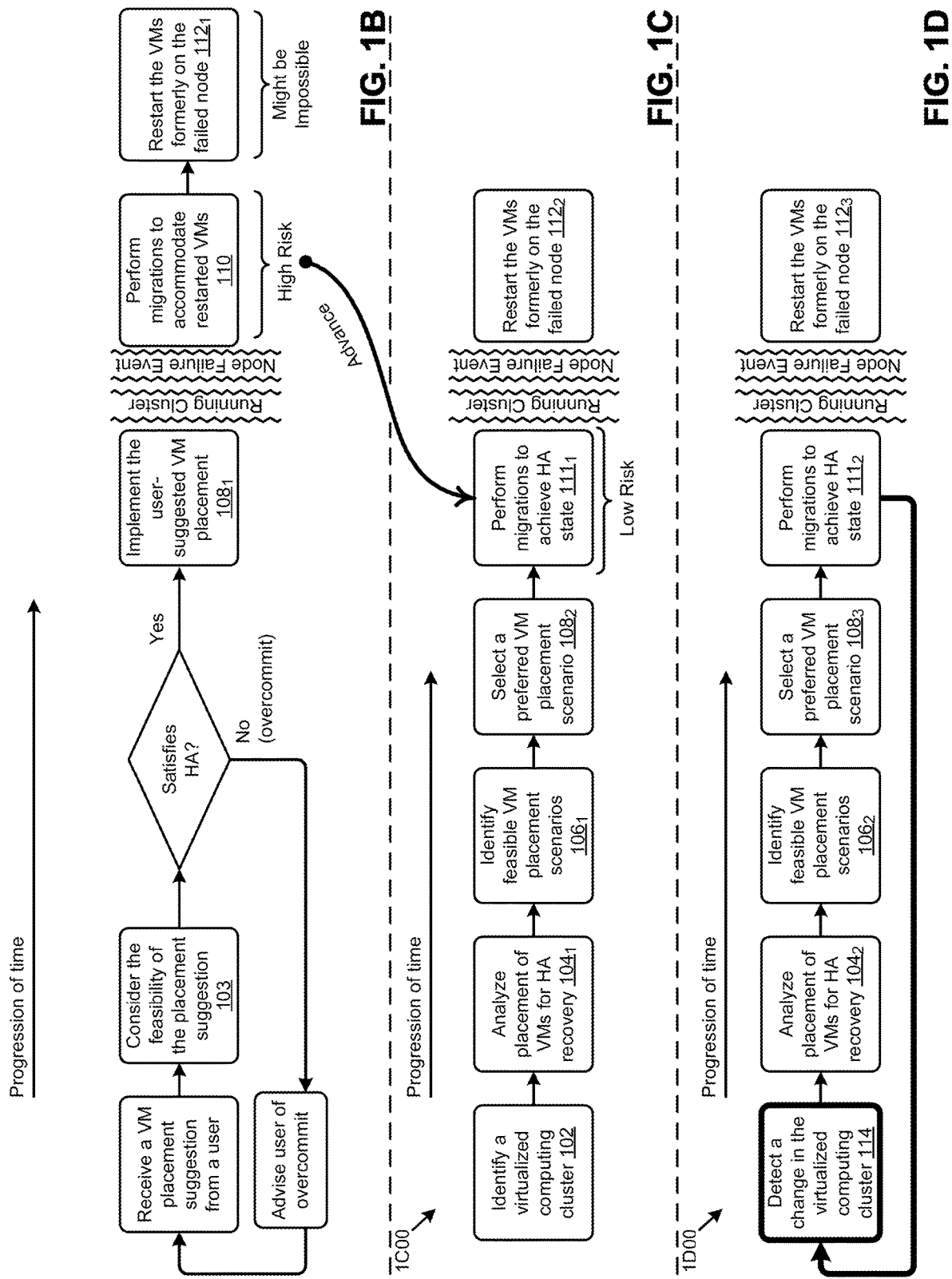

OPTIMIZING HIGH-AVAILABILITY VIRTUAL MACHINE PLACEMENTS IN ADVANCE OF A COMPUTING CLUSTER FAILURE EVENT

RELATED APPLICATIONS

The present application is related to co-pending U.S. patent application Ser. No. 17/816,196 titled "REPAIRING HIGH-AVAILABILITY VIRTUAL MACHINE PLACEMENTS IN A COMPUTING CLUSTER", filed on even date herewith, which is hereby incorporated by reference in its entirety.

TECHNICAL FIELD

This disclosure relates to virtualized computing clusters, and more particularly to techniques for determining and maintaining high-availability virtual machine placements in a computing cluster.

BACKGROUND

The concept of high availability (HA) of a virtualized cluster refers to the ability for the cluster to recover from a node failure (e.g., the node itself fails, or access to the node from within the cluster fails). In order to recover from an event that causes a node to fail (or an event that causes infrastructure needed to access the node to fail), a computing cluster configured for high availability will place the computing entities (e.g., virtual machines, other virtualized entities) that were running on the failed node onto a surviving node and then revive the computing entities of the failed node on a corresponding one of the surviving nodes (i.e., where the replacement computing entities were placed).

It sometimes happens that the configuration of the virtual machines on the surviving nodes does permit placing the computing entities of the failed node onto the surviving nodes (e.g., there are sufficient resource blocks available on the surviving nodes), however there are situations where there is no feasible computing entity placement scenario that applies to the then-current computing entity placement state at the surviving nodes. This then has the strongly undesirable consequence that the desired high-availability configuration cannot be achieved without intervention, for example to move (e.g., migrate) some of the computing entities from one of the surviving nodes to a different surviving node. This situation should be avoided, at least since it follows that if there is some sort of failure event affecting one node of the cluster, that failure event might have a ripple effect that alters expected performance and capabilities of the virtualized computing cluster as a whole. As such, any cluster reconfiguration activities (e.g., adding a cluster node, moving virtualized entities between surviving nodes, etc.) might be deleteriously impacted.

In modern clustered computing settings, it can happen that there are a large number (e.g., 32, 512, 1024, etc.) nodes in the cluster. This complicates maintaining an HA-compliant configuration at least since the number of possibilities of feasible placement scenarios explodes. Consider a case of a cluster that is composed of 1024 nodes, each hosting and average of 10 distinct computing entities. This leads to a permutation explosion. That is, since each computing entity is distinct, and moreover each computing entity could be placed on, for example, 31 different nodes (assuming a single node failure), then we have the permutation situation where there are 31*10 different items to be placed over 31 different possible nodes. Using the permutation formula $M=(N!)/(N-R)$ where N is (31*10) and R is 31, this formula evaluates to an astronomical number of placement scenarios. This presents the problem that a 'good' placement scenario needs to be drawn from this potentially astronomical number of placement scenarios. This problem is made still more complicated when one considers that, since there are many occurrences in a computing cluster that impact HA compliance, it might happen that a computing cluster is repeatedly moved out of HA compliance. What is needed is a way to advance over legacy techniques.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for carrying out high-availability VM placement in advance of a failure event, which techniques advance the relevant technologies to address technological issues with legacy approaches. More specifically, the present disclosure describes techniques used in systems, methods, and in computer program products for optimizing high-availability virtual machine placements in advance of a computing cluster failure event.

The disclosed embodiments modify and improve over legacy approaches. In particular, the herein-disclosed techniques provide technical solutions that address the technical deficiency that merely selecting a feasible HA solution leads to non-optimal computing cluster configurations. Such technical solutions involve specific implementations (e.g., data organization, data communication paths, module-to-module interrelationships, etc.) that relate to the software arts for improving computer functionality. Various applications of the herein-disclosed improvements in computer functionality.

The ordered combination of steps of the embodiments serve in the context of practical applications that perform steps for initially, and on an ongoing basis, achieving a high-availability placement of virtual machines before occurrence of a failure event. As such, the herein-disclosed techniques overcome long-standing yet heretofore unsolved technological problems associated with merely selecting a feasible, but non-optimal HA placement scenario.

Many of the herein-disclosed technological solutions pertain to technological problems that arise in the hardware and software arts that underlie virtualized computing clusters. Moreover, the claimed invention is an improvement over legacy techniques, at least because application of these technological solutions not only enhances node configuration/reconfiguration flexibilities, but also leads to shorter processing times, less demand for an amount of memory, and less demand for an amount of network bandwidth. Aspects of the present disclosure achieve performance and other improvements in peripheral technical fields including, but not limited to, hyperconverged computing platform management and bin packing optimizations.

Some embodiments include a sequence of instructions that are stored on a non-transitory computer readable medium. Such a sequence of instructions, when stored in memory and executed by one or more processors, causes the one or more processors to perform a set of acts for both initially, and on an ongoing basis, achieving an optimized high-availability placement of computing entities before occurrence of a failure event.

Some embodiments include the aforementioned sequence of instructions that are stored in a memory, which memory is interfaced to one or more processors such that the one or more processors can execute the sequence of instructions to cause the one or more processors to implement acts for both initially, and on an ongoing basis, achieving an optimized high-availability placement of computing entities before occurrence of a failure event.

In various embodiments, any combinations of any of the above can be organized to perform any variation of acts for optimizing high-availability virtual machine placements in advance of a computing cluster failure event, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1A1 illustrates how different high-availability configurations are applied over a computing cluster, according to some embodiments.

FIG. 1A2 depicts a user interface that is configured to permit user selection of two or more optimization functions that inform automatic selection of a preferred high-availability computing entity configuration, according to some embodiments.

FIG. 1B illustrates commonly-encountered problems in achieving high-availability VM placement on a non-empty cluster.

FIG. 1C exemplifies a high-availability VM placement technique as used in systems that perform VM migrations in advance of a failure event, according to some embodiments.

FIG. 1D exemplifies a continual high-availability VM placement technique as used in systems that perform VM migrations in advance of a failure event, according to some embodiments.

DETAILED DESCRIPTION

Figure 2A:
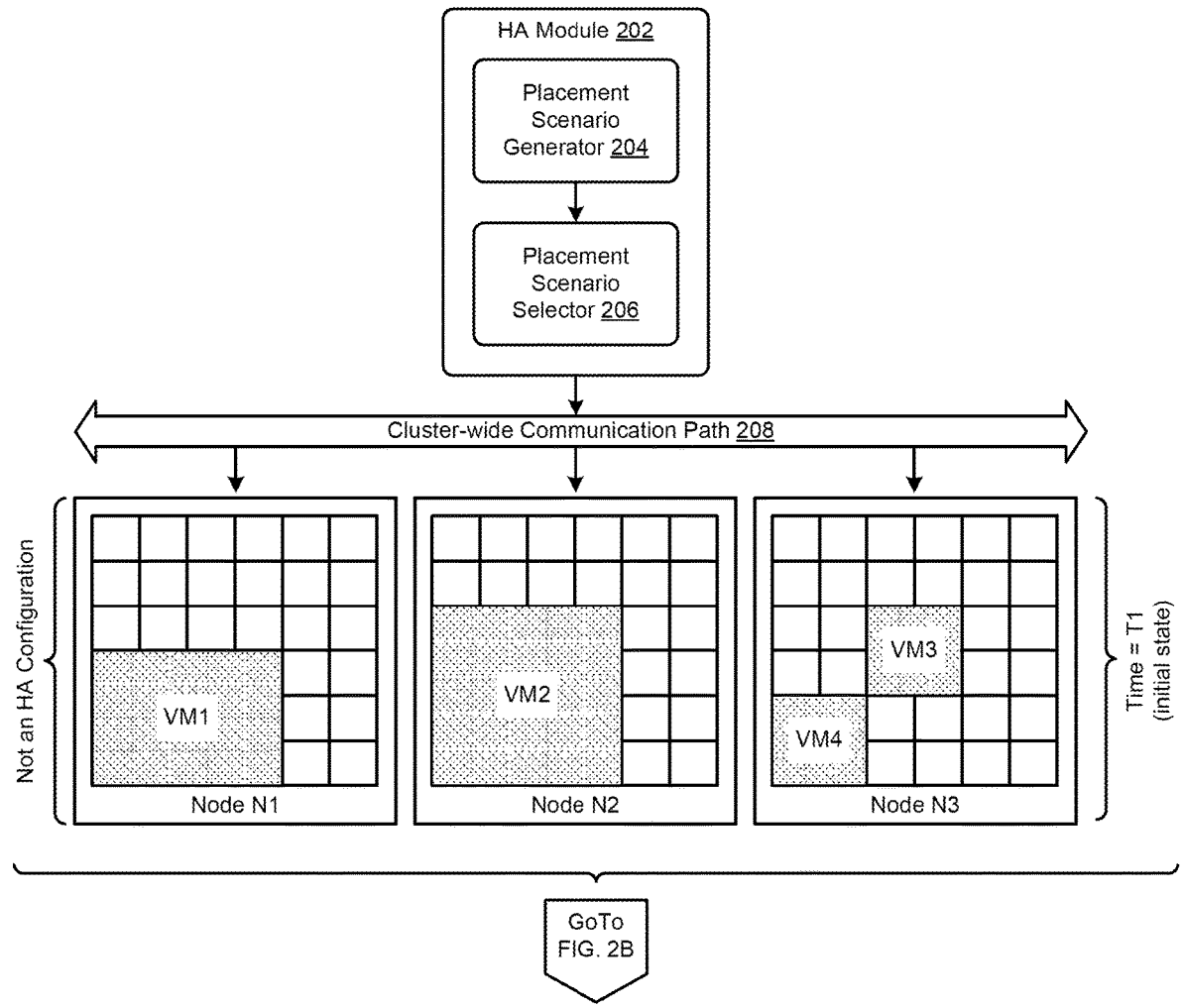
FIG. 2A shows an example computing cluster that proactively performs node-to-node VM migrations in advance of a failure event, according to some embodiments.

Aspects of the present disclosure solve problems associated with selecting non-optimal HA solutions when configuring a computing cluster. These problems are unique to, and may have been created by, various computer-implemented methods that naively perform computing cluster re-configurations based on non-optimal placements. Some embodiments are directed to approaches for continually monitoring configuration changes (e.g., changes in VM constituency, changes to a node of the cluster, etc.) that occur in/on a computing cluster so as to proactively migrate VMs of a computing cluster into an HA configuration in advance of occurrence of a failure event. The accompanying figures and discussions herein present example environments, systems, methods, and computer program products.

Overview

What is needed is a way to avoid the need to perform computing entity migrations over surviving nodes of a computing cluster after occurrence of a failure event that causes one of the nodes of the computing cluster to be deemed as failed. This need becomes acute when one recognizes that at the time there is some sort of failure event affecting one particular node of a cluster, that failure event, and/or its underlying cause or causes, might have a ripple effect that alters expected performance and capabilities of the unexpectedly degraded virtualized computing cluster as a whole. As such, any cluster reconfiguration and/or migration activities (e.g., migrating VMs between the surviving nodes, etc.) might be deleteriously impacted. This ripple effect and/or underlying causes often leads to a computing cluster that is significantly less resilient than in the moment before the failure event. Unfortunately, the need for performing the aforementioned migrations happens right at the moment when additional system resources are being demanded to carry out remediation operations that are intended to reduce the impact to the computing cluster incurred by the loss of a node. Disclosed herein are techniques to avoid or mitigate this loss of resilience, while nevertheless honoring a specified degree of fault tolerance.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1 illustrates how different high-availability configurations are applied over a dynamically-changing computing cluster. The shown lifecycle progresses from a particular running state through additional running states. The figures also depicts various states of the computing cluster after significant events (e.g., failure of a node of the cluster, state after redeployment of computing units onto surviving nodes, remediation of the failed node, etc.).

As shown, the lifecycle commences at operation 1, where an agent (not shown) deploys computing entities over the nodes of the shown multi-node computing cluster. In many cases, the agent may randomly or arbitrarily deploy computing entities over the nodes of the cluster so long as they fit. In most cases a random or arbitrary initial deployment of computing entities over the nodes of the cluster is not configured to be high-availability compliant (HA compliant). However, in many situations a system administrator or cluster administrator may specify particular fault tolerance parameters for the cluster. For example, a system administrator or cluster administrator may require that the cluster can self-reconfigure for continued operation even if one of the nodes "goes down". Additionally or alternatively, a system administrator or cluster administrator may specify that the reconfiguration time be no longer that 1 minute. Additionally or alternatively, a system administrator or cluster administrator may specify that the reconfiguration restores the cluster such that "at most" 5 minutes of data are lost.

In these high-availability situations, it is necessary to plan ahead such that, for example, in the case of one or more node failures, the system is able to automatically redeploy the computing entities (e.g., applications, tasks, virtual machines, executable containers, virtualized disks, etc.) that were formerly running on the downed one or more nodes. It happens that certain placements of computing entities over a plurality of nodes exhibit what is known as a high-availability (HA) deployment. Such an HA deployment satisfies the conditions that (1) the computing entities of a failed node can be placed across nodes of the cluster without adding additional hardware resources to the cluster, and (2) that the placement of the computing entities satisfies the high-availability requirement.

As such, if/when a node fails (event 3), computing entities that were running on a failed node are redeployed onto surviving nodes (operation 4A and/or operation 4B). Running on a cluster that has been so reconfigured can continue on the surviving nodes, at least until such time as a failure remediation action has been taken (operation 5). As is known by those of skill in the art, it can happen that when computing entities that were running on a failed node (operation 4A and/or operation 4B) are redeployed onto surviving nodes, the resulting configuration of the computing entities over the nodes of the cluster might not satisfy the aforementioned high-availability requirement.

As used herein, a surviving node refers to those computing platforms of a computing cluster that remain operational in spite of a failure of one or more of the computing platforms of the computing cluster. For example, if a cluster is initially configured as an interconnection between three computing platforms A, B, and C, and C fails (but A and B do not fail), then the surviving nodes are A and B.

Now, at some moment in time, specifically after at least some of the effects of the failure remediation action (operation 5) have taken place, then the remediated multi-node computing cluster can be returned to an HA-compliant state and continue to run. During the time period between the node failure event (event 3) and the time when at least some of the effects of the failure remediation action (operation 5) have taken place, the multi-node computing cluster operates in a slightly degraded configuration—at least because the cluster has one fewer nodes during this time period. Once at least some of the effects of the failure remediation action (operation 5) have taken place, an agent of the system (e.g., a computing agent operating within the cluster or a computing agent operating on a node that is not part of the cluster) can move the computing entities that were formerly redeployed (e.g., by operation 4A and/or operation 4B) to the restored or replaced node and the multi-node computing cluster resumes operation in a manner that includes the restored or replaced node.

The aforementioned agent (e.g., monitoring agent 115), either autonomously or in conjunction with any other operational element, can monitor aspects of the multi-node computing cluster. In the event that there are changes made to the configuration of the multi-node computing cluster, the aforementioned agent can respond to the configuration changes (operation 6). In some cases, a detected configuration change might cause the then-current conditions of the multi-node computing cluster to move out of an HA-compliant state. In such a situation, operation 6 might serve to apply further changes to the multi-node computing cluster so as to bring the multi-node computing cluster back into HA compliance. More specifically, operation 6 might serve to move computing entities between nodes of the multi-node computing cluster so as to re-establish HA compliance. On ongoing basis, the aforementioned agent can respond to ongoing configuration changes by moving computing entities between nodes of the multi-node computing cluster. The selection of which computing entities are selected and moved is not arbitrary. That is, there are often many different placement scenarios that are at least feasible placement scenarios for accomplishing a high-availability computing entity configuration.

The configuration of the multi-node computing cluster of FIG. 1A1 (e.g., at operation 1) serves to initially establish one or more failure mode parameters that define a high-availability requirement of the multi-node computing cluster. During the course of analysis of the then-current virtual machine placement configuration of the multi-node computing cluster, it can be determined that there are a plurality of alternate feasible virtual machine placements that satisfy the high-availability requirement (e.g., in spite of failure of one or more nodes of the multi-node computing cluster). For example, it can happen that a first alternate feasible virtual machine placement might demand a first number of VM migrations, whereas a second alternate feasible virtual machine placement might demand a different, second number, of VM migrations. Between these alternatives, the better alternate feasible virtual machine placement is selected. For example, the first alternate feasible virtual machine placement might be selected when the first number of VM migrations for the first alternate feasible virtual machine placement is less than the second number of VM migrations for the second alternate feasible virtual machine placement.

The foregoing is merely one illustrative example of a selection technique. Various other techniques for selecting from among many different feasible placement scenarios are shown and described as pertains to the figures and corresponding written descriptions herein.

FIG. 1A2 depicts a user interface 1A200 that is configured to permit user selection of two or more optimization functions that inform automatic selection of a preferred high-availability computing entity configuration, according to some embodiments.

The figure is being presented to illustrate how a user can influence automatic placement of virtual machines into a high-availability computing entity configuration. More specifically, since there are many, possibly hundreds or thousands (or more) high-availability computing entity configuration scenarios, some means for choosing a preferred scenario needs to be provided. In some cases there can be a large difference in "goodness" of one placement scenario over another and, as such, what is desired is some means for choosing a single optimal scenario from among the many high-availability computing entity configuration scenarios.

FIG. 1A2 illustrates how one or more optimization functions can be selected via a user interface. The selected one or more optimization functions are in turn applied to at least some of the many high-availability computing entity configuration scenarios so as to identify optimal configuration scenarios. In some situations, it can happen that there are many configuration scenarios that are quantitatively just as optimal based on a selected optimization function (e.g., there can be many configuration scenarios that are equally advantageous). To accommodate this situation where there are many configuration scenarios that are quantitatively just as optimal based on a first optimization function, a second optimization function can be applied over at least some of the configuration scenarios that are quantitatively equally advantageous.

Manipulation of the user interface widgets of FIG. 1A2 illustrates how a primary optimization function, a secondary optimization function, and so on, can be selected via a user interface. The graphical user interface 192 of FIG. 1A2 is shown merely as an example to illustrate how a human user can manipulate of the user interface widgets of FIG. 1A2 to select primary and secondary optimization functions. However, a primary optimization function and/or a secondary optimization function could be specified by a computing agent that does not rely on a human user to provide such input.

The shown example includes a primary optimization function pulldown menu 193 and a secondary optimization function pulldown menu 194. A user or computing agent can access a listing of primary optimizations functions (e.g., the shown first set of example optimization functions 195) and select a primary optimization function. Similarly, a user or computing agent can access a listing of secondary optimizations functions (e.g., the shown second set of example optimization functions 196) and select a secondary optimization function.

The optimization functions (e.g., any of the optimization functions depicted in the optimization function library 197) can refer to specific quantitative values and/or evaluation methods that pertain to a minimization objective or a maximization objective. The shown examples are merely for illustration and many other optimization functions and/or minimization or maximization objectives and/or minimization or maximization calculation methods can be defined.

Analysis of possible minimization objectives and/or maximization objectives, and selection of an optimal configuration is non-trivial. Accordingly, this problem has not been solved or even addressed in legacy implementations. FIG. 1B highlights the nature of problems to be solved. FIG. 1C and FIG. 1D disclose possible solutions.

FIG. 1B illustrates commonly-encountered problems in achieving high-availability VM placement on a non-empty cluster. As depicted in FIG. 1B, some legacy implementations merely consider the feasibility of a placement suggestion (step 103) and thereafter merely report whether or not the suggested placement is able to satisfy a particular high availability requirement.

In the case that the user-provided placement suggestion would result in an overcommitment of any node of the cluster, then rather than honoring the placement suggestion, the user is merely advised of the overcommitment. On the other hand, if the suggested placement would not incur an overcommitment, then the suggested placement is honored (step $108_1$). After a failure event that results in a failed node, then step 110 serves to move VMs around so as to make room (if possible) for the VMs of the failed node. The VMs of the failed node are then restarted, if possible (step $112_1$) over the surviving nodes.

FIG. 1B and the discussion thereto highlights one of the problems to be solved, namely that the moment in time immediately after a node failure is an inopportune time to perform migrations and/or to only then find out that some particular desired HA property cannot be achieved. Fortunately, in accordance with the disclosure herein, various operations to select a feasible placement scenario and cause that placement scenario to be brought to effect (e.g., by migrating some VMs to achieve a high availability compliance state) could be advanced so as to be performed before a failure event. This is shown and discussed as pertains to FIG. 1C and FIG. 1D.

FIG. 1C exemplifies a high-availability VM placement technique 1C00 as used in systems that perform VM migrations in advance of a failure event. As an option, one or more variations of high-availability VM placement technique 1C00 or any aspect thereof may be implemented in the context of the architecture and functionality of the embodiments described herein and/or in any environment.

As shown, the various operations (e.g., step 102, step $104_1$, step $106_1$, step $108_2$, and step $111_1$) to select a feasible placement scenario and cause that placement scenario to be brought into effect by migrating some VMs to achieve a high availability compliance state. Such a feasible placement is performed before a failure event. As such, if/when a failure event does occur, then the VMs that had been running on the failed node(s) are restarted (step 1122) on one of the surviving nodes.

As used herein a compliance state refers to a set of conditions of a computing cluster, wherein at least some of the set of conditions corresponds to a high availability requirement. A computing cluster can undergo any number of transitions from one compliance state to another compliance state. A given compliance state might satisfy a high availability requirement. Alternatively, a given compliance state might not satisfy a high availability requirement.

In some cases, some or all of the VMs running on a computing cluster might be altered during operation of the computing cluster. For example, a VM might be re-sized, or a VM might be added to the running multi-node computing cluster. Ongoing, continual readiness to move into HA-compliance can be facilitated by observing changes as they occur on the computing cluster. The changed configuration then becomes the subject of operations to select a feasible placement scenario and to migrate VMs so as to achieve that selected placement scenario. This monitoring for changes and taking action based on the detection of such a change is shown and discussed as pertains to FIG. 1D.

FIG. 1D exemplifies a continual high-availability VM placement technique 1D00 as used in systems that perform VM migrations in advance of a failure event. As an option, one or more variations of continual high-availability VM placement technique 1D00 or any aspect thereof may be implemented in the context of the architecture and functionality of the embodiments described herein and/or in any environment.

FIG. 1D is being presented to illustrate how a high availability compliance state can be maintained and/or remediated over time—even though there may be many changes occurring on the cluster.

Step 114 serves to detect a change in the configuration of the cluster. In this context, a detectable change arises due to the addition of a new VM or deletion/completion of a previously running VM. Further, a detectable change might arise due to a change in the node constituency of the cluster (e.g., the addition or deletion of a node). In some situations, a detectable change might arise due to a change to a node capability. For example, a particular node might have been originally configured to allocate 60 GB of memory to the running of VMs, however at some moment in time, an agent (e.g., an administrator who is a person or computing agent that manages the cluster) might decrease the amount of memory to 50 GB. Such a change might cause a formerly HA-compliant VM placement configuration to become no longer HA compliant.

When a change is detected, the change is a priori deemed to at least potentially affect HA compliance and, as such, the then-current characteristics of the cluster (i.e., as a result of the detected change) are gathered and the then-current VM placement is analyzed (step $104_2$) to determine whether or not the then-current VM placement is HA compliant in spite of the detected change. In the situation that the then-current VM placement is no longer HA compliant, then in accordance with the flow of FIG. 1D, feasible HA-compliant VM placement scenarios are calculated (step $106_2$) and at least one of the feasible HA-compliant VM placement scenarios is selected (step $108_3$). Now, before a possible failure event, any needed migrations or other actions are undertaken so as to put the cluster into an HA-compliant state (step $111_2$). The VMs of the cluster, some of which have been migrated from one node to another node, continue running.

In the case of a failure event (e.g., loss of functionality of one of the nodes of the cluster), then the VMs that were running on the lost node are restarted on the surviving nodes (step $112_3$). It should be pointed out that, since the HA-compliant state of the cluster is maintained continuously, then when there is a failure event such as loss of functionality of one of the nodes of the cluster, then it is guaranteed that the VMs that were running on the lost node can indeed be restarted on the surviving nodes—yet without performing any migrations of VMs on the surviving nodes, and without having to add resources to the cluster. As heretofore indicated, performing migrations to place the computing cluster into an HA-compliant state prior to a failure of the computing cluster has significant advantages, not the least of which is that doing so avoids reconfiguration operations on a degraded computing cluster.

There are many ways for a computing cluster to self-configure in the presence of a change to the computing cluster. FIG. 2A shows and describes one particular implementation. Furthermore, the discussion of FIG. 2A and FIG. 2B includes a numeric example.

FIG. 2A shows an example computing cluster that pro-actively performs node-to-node VM migrations in advance of a failure event. As an option, one or more variations of computing cluster or any aspect thereof may be implemented in the context of the architecture and functionality of the embodiments described herein and/or in any environment.

Strictly as an illustrative example, FIG. 2A depicts node resources in two dimensions. A vertical dimension characterizes an amount of memory available to VMs, while a horizontal dimension characterizes an availability of CPU power (e.g., CPU cores). An example configuration of several VMs (e.g., VM1, VM2, VM3, and VM4) are distributed across several nodes (e.g., node N1, node N2, and node N3) and are shown with respect to a memory demand amount (depicted by the height) and a CPU resource demand amount (depicted by a width) of each virtual machine.

The shown VM placement is not HA compliant. Table 1 is presented below to illustrate reasons why the shown VM placement is not HA compliant (i.e., because the HA requirement cannot be satisfied by surviving nodes of the cluster). More specifically, and as depicted in further detail in Table 1, since there is at least one situation of a node failure where the VMs of the failed node cannot be placed onto the surviving nodes, the placement as shown in FIG. 2A is not HA compliant.

TABLE 1

Initial state at time = T1

| HA Requirement | VMs to be Considered | Node Failure Event(s) | Reason Why the HA Requirement Cannot be Satisfied |
|---|---|---|---|
| FT = 1 node failure | {VM1, VM2, VM3, and VM4} | N1 fails | VM1 cannot be restarted on surviving node N2 and cannot be restarted on surviving node N3 |
| FT = 1 node failure | {VM1, VM2, VM3, and VM4} | N2 fails | VM2 cannot be restarted on surviving node N1 and cannot be restarted on surviving node N3 |
| FT = 1 node failure | {VM1, VM2, VM3, and VM4} | N3 fails | VM3 can be restarted on surviving node N1, but then VM4 cannot be restarted on any surviving node, OR VM4 can be restarted on surviving node N1, but then VM3 cannot be restarted on any surviving node |

The shown placement can be modified to bring the cluster into HA compliance (e.g., by migrating one or more VMs of the cluster to a different node). The determination of one or more specific scenarios where, by migrating one or more VMs of the cluster to a different node, the HA requirement can be satisfied, can be made by HA module 202. The shown HA module 202 is merely one example of partitioning the functions of placement scenario generation and placement scenario selection. In this particular partitioning, placement scenario generator 204 performs the function of placement scenario generation, whereas placement scenario selector 206 performs the function of placement scenario selection (e.g., by selecting one or more of the placement scenarios generated by the placement scenario generator).

Further, HA module 202 is able to instruct migration of the VMs by communicating over a cluster-wide communication path 208 that operatively connects the nodes of the cluster. At least inasmuch as it is desired to achieve an HA-compliant state in the cluster in advance of a failure event, the HA module can proactively perform VM migrations based on analysis of a then-current cluster configuration so as to bring the cluster in compliance with any then-current high availability requirements.

As used herein a high availability requirement refers to a set of one or more constraints that establish a minimum compliance state of a computing cluster. For example, a high availability requirement might refer to a constraint to be applied over a computing cluster such that the computing cluster must be configured (e.g., by VM placements) to have sufficient available resources to run all running processes of the computing cluster even after failure of a node of the computing cluster. As another example, a high availability requirement might refer to a constraint to be applied over a computing cluster such that the virtual machines that were running on a failed node can be placed across surviving nodes of the cluster without adding additional hardware resources to the cluster, and such that the placement of virtual machines across surviving nodes of the cluster can be accomplished without having to migrate VMs that are running on the surviving nodes of the computing cluster.

An example non-compliant configuration is shown in FIG. 2A. In spite of a high availability requirement that corresponds to a single node failure level of fault tolerance, the example non-compliant configuration can be remediated using the node-to-node virtual machine migration techniques as disclosed herein.

Figure 2B:
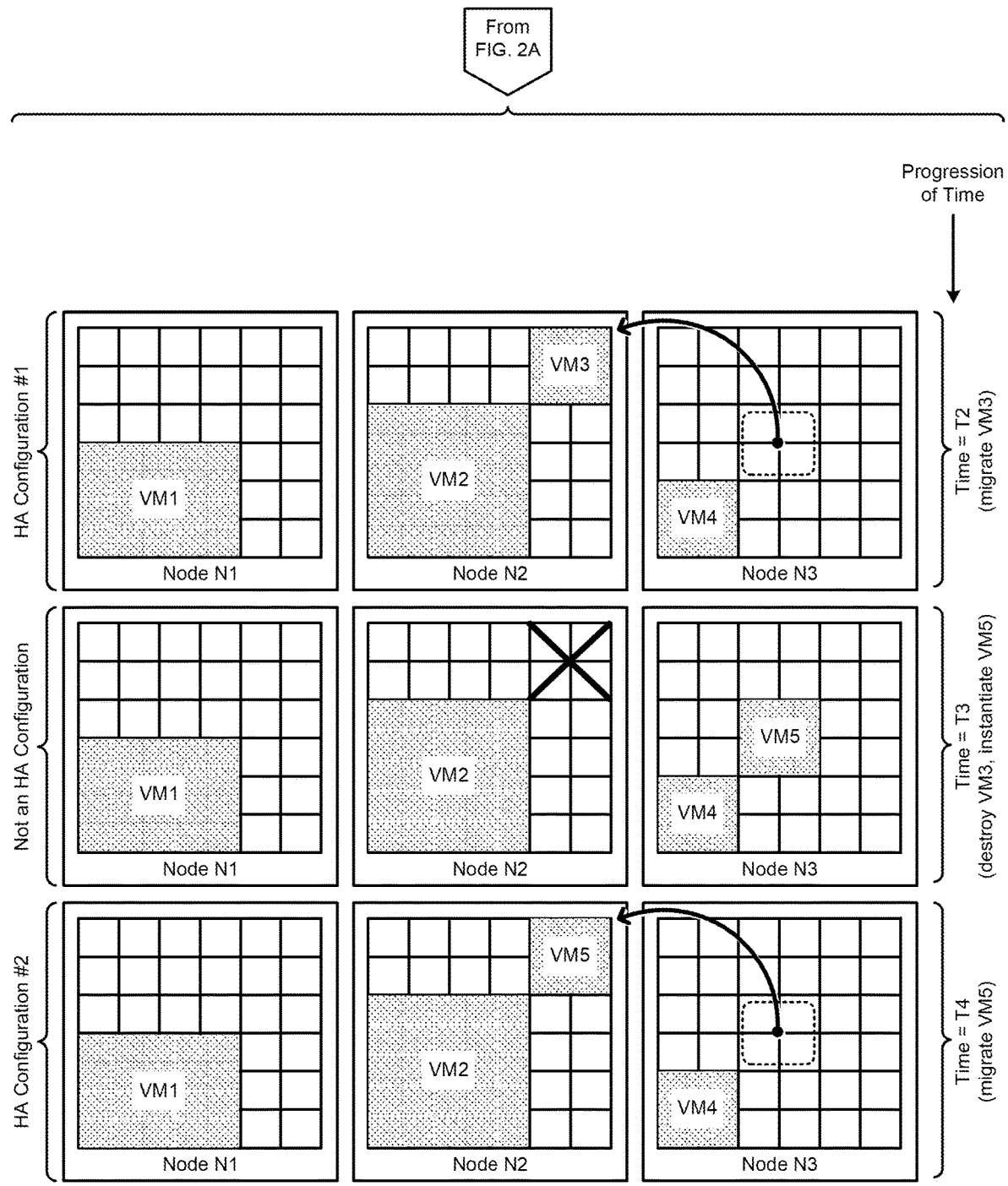
FIG. 2B shows example node-to-node virtual machine migrations that are proactively performed based on analysis of a cluster configuration, according to some embodiments.

FIG. 2B shows example node-to-node virtual machine migrations that are proactively performed based on analysis of a cluster configuration. As an option, one or more variations of virtual machine migrations or any aspect thereof may be implemented in the context of the architecture and functionality of the embodiments described herein and/or in any environment.

As shown and described as pertains to the example placement showing in FIG. 2A, that example placement is not HA compliant. However, it can be seen that the non-HA-compliant configuration can be remediated (e.g., brought into HA compliance) by migrating VM3 from node N3 to node N2. Table 2 details the specifics of how the migration of VM3 from node N3 to node N2 serves to bring the cluster into HA compliance.

TABLE 2

HA configuration #1 at time = T2

| HA Requirement | VMs to be Considered (after migrating VM3 from node N3 to node N2) | Node Failure Event(s) | Ways That the HA Requirement Can (or Cannot) be Satisfied |
|---|---|---|---|
| FT = 1 node failure | {VM1, VM2, VM3, and VM4} | N1 fails | VM1 can be restarted on surviving node N3 (since there is a 3 × 3 slot available on N3) |
| FT = 1 node failure | {VM1, VM2, VM3, and VM4} | N2 fails | VM2 can be restarted on surviving node N3 (since there is a 4 × 4 slot available on N3) and VM3 can be restarted on surviving node N1 (since there is a 2 × 2 slot available on N1) |
| FT = 1 node failure | {VM1, VM2, VM3, and VM4} | N3 fails | VM4 can be restarted on surviving node N1 (since there is a 2 × 2 slot available on N1) |

Now, suppose that VM3 terminates. The cluster is still in an HA-compliant state, however further suppose that a new VM, VM5, is newly started on node N3 so as to satisfy load balancing policies, or because VM5 has an affinity policy pertaining to N3. In this case, the load balancing policy and/or the affinity policy operates in tension with the HA requirement. That is, the placement of VM5 onto N3 would result in a non-HA-compliant placement at time=T3. It can be remediated by overriding the load balancing policy and/or overriding the affinity policy and then migrating VM5 to node N2. This results in an HA-compliant configuration for the cluster at time=T4. More specifically, this results in an HA-compliant configuration in the face of a single node failure. HA compliance for a single node failure (FT=1) of this cluster is shown in Table 3.

TABLE 3

HA configuration #2 at time = T4

| HA Requirement | VMs to be Considered (after migrating VM5 from node N3 to node N2) | Node Failure Event(s) | Ways That the HA Requirement Can Be Satisfied |
|---|---|---|---|
| FT = 1 node failure | {VM1, VM2, VM4, and VM5} | N1 fails | VM1 can be restarted on surviving node N3 |
| FT = 1 node failure | {VM1, VM2, VM4, and VM5} | N2 fails | VM2 can be restarted on surviving node N3 and VM5 can be restarted on surviving node N1 |
| FT = 1 node failure | {VM1, VM2, VM4, and VM5} | N3 fails | VM4 can be restarted on surviving node N1 |

The foregoing examples start from a non-HA-compliant configuration running on a non-empty cluster and are brought into an HA-compliant configuration; however, in accordance with the disclosures herein, embodiments can be configured to be able to operate from any configuration of the computing cluster, including from some initial empty cluster. One possible implementation of a system that can start from any configuration of the computing cluster and self-heal is shown and described as pertains to the state machine depicted by the state chart of FIG. 3.

Figure 3:
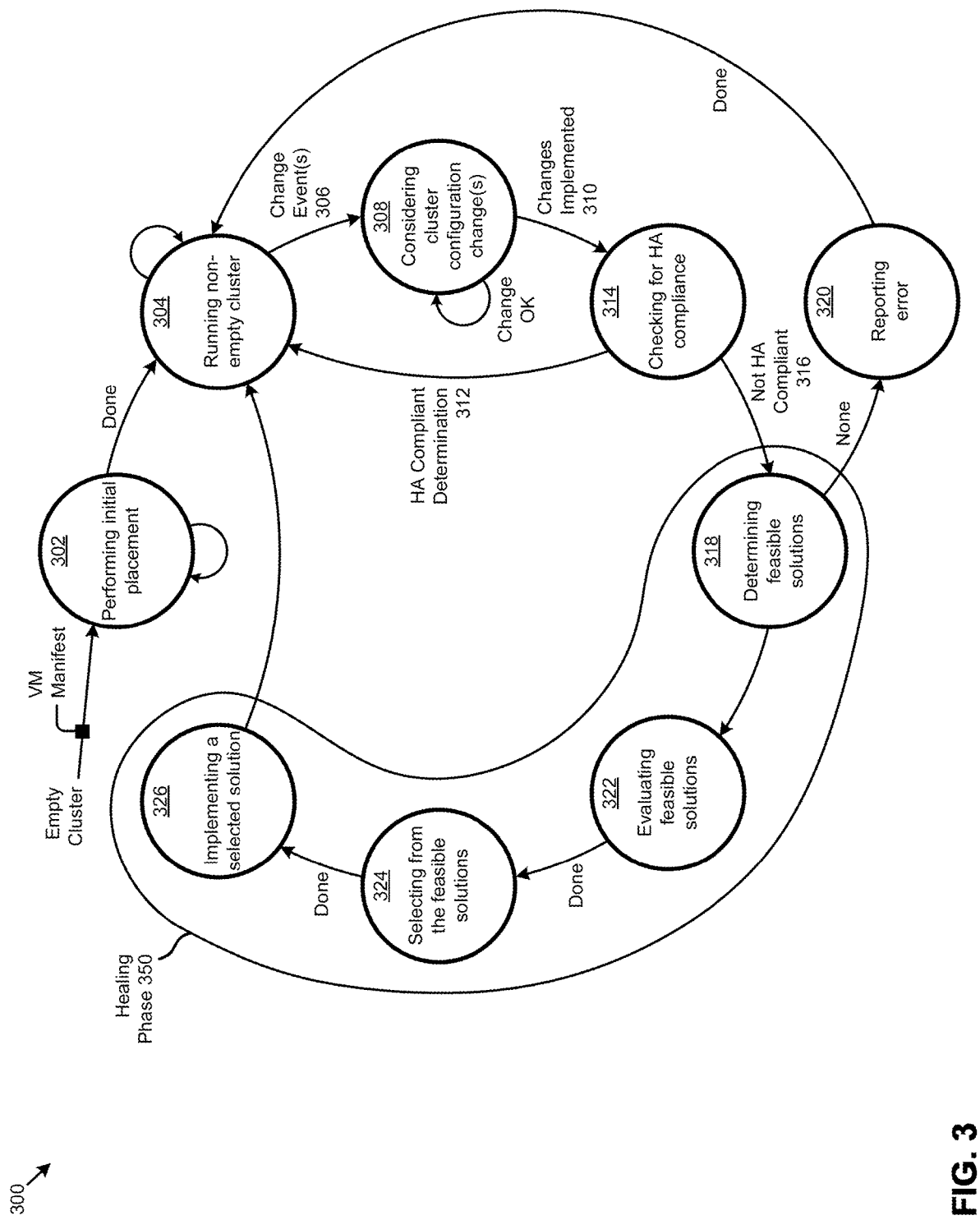
FIG. 3 is a state chart depicting a state machine as implemented in systems that perform VM migrations in advance of a failure event, according to some embodiments.

FIG. 3 is a state chart 300 depicting a state machine as implemented in systems that perform VM migrations in advance of a failure event. As an option, one or more variations of state machine or any aspect thereof may be implemented in the context of the architecture and functionality of the embodiments described herein and/or in any environment.

As shown, the state chart is entered when an empty cluster and a VM manifest are provided to the underlying system. That event moves into state 302 whereby the system analyzes the cluster and commences performing an initial HA-compliant placement of the virtual machines of the VM manifest. When the initial placement is deemed to be "Done", then processing moves to state 304 where the VMs of the VM manifest run. The VMs run in this initial HA-compliant configuration until such time as change event(s) 306 is/are detected. The detection of such an event or events moves processing into state 308, wherein acts for considering the cluster configuration change(s) are carried out. It should be noted that any single change might not affect HA compliance; however, it often happens that a combination of two or more changes do, in combination, affect HA compliance. Accordingly, and referring to step 308, individual changes may be considered singly, yet checking for HA compliance is deferred until all of the changes have been implemented (as depicted by the condition labeled "changes implemented 310"). That is, and as shown in this example, checking for HA compliance (state 314) commences after all of the changes have been implemented.

It can happen that after all of the changes have been implemented in the computing cluster, the computing cluster is still deemed to be HA compliant. In this situation, the state machine takes path 312 and returns back to state 304 where the VMs continue to run in the non-empty, HA-compliant configuration. Alternatively, it can happen that after all of the changes have been implemented in the computing cluster, the computing cluster is deemed to be out of HA compliance and healing phase 350 begins. In this healing phase, and in accordance with the condition of "not HA compliant 316", the state machine begins to perform the function of placement scenario generation (state 318).

As discussed hereunder, feasible solutions are those that can at least be potentially implemented over surviving nodes of the subject computing cluster so as to remediate the computing cluster back into an HA-compliant state. In exemplary cases, feasible solutions are those placements that satisfies two conditions, namely (1) the condition that the running virtual machines of a failed node can be placed across nodes of the cluster without adding additional hardware resources to the cluster, and (2) the condition that the placement satisfies the high-availability requirement (e.g., single node failure, two node failure, etc.).

On one hand, it can happen that there are no such feasible solutions to bring the computing cluster into HA compliance. This can happen, for example, if the nodes, either singly or in combination, are deemed to be overcommitted to the extent that there is no remediation possible given the constituency of the subject computing cluster. In some situations, this can be remediated by adding a new computing node and/or by adding resources to the nodes of the cluster. Such remediation might involve intervention by a cluster administrator. As such, state 320 serves for reporting (e.g., to an administrator) that the computing cluster is not in HA compliance. The administrator might take action (not shown), or the administrator might not be available to take action, in which case the state machine returns to running VMs on the non-empty cluster (state 304).

On the other hand, it can happen that there are feasible solutions to bring the computing cluster into HA compliance. In such a case, processing moves onward to begin evaluating feasible solutions (state 322). When considering that a modern computing cluster may be composed of many nodes (e.g., 16 nodes, 32 nodes, 128 nodes, 1024 nodes, etc.) it might happen that there are a large number of feasible solutions, some of which are "better" than others with respect to some quantitative variable (e.g., minimum number of VMs to be migrated, etc.). Accordingly, when the feasible solutions have been at least partially evaluated, then processing moves onward into state 324 that performs the function of placement scenario selection.

It should be noted that there are many reasons (e.g., quantitative reasons) why one placement scenario would be preferred over another placement scenario. Strictly as examples, such reasons might pertain to optimization of one or more quantitative measures (e.g., minimums, maximums, averages, standard deviations, etc.) pertaining to an amount of memory headroom, an amount of CPU headroom, load balancing, affinities, anti-affinities, etc. As such, any/all of the feasible placement scenarios can be evaluated and scored with a quantitative value. In accordance with this particular state machine embodiment, scoring of any/all of the feasible placement scenarios can commence when the state machine moves to state 326.

of resources, whereas virtualized entity 'E' demands 1.5 units of resources. Continuing, node N2 hosts virtualized entity 'D' that demands 3 units of resources, and node N3 hosts virtualized entity 'C' that demands 2 units of resources. This virtualized entity placement is HA compliant as is detailed in Table 4.

TABLE 4

| Scenario #1 (initial state) | | |
| --- | --- | --- |
| HA Requirement | Node Failure Event(s) | Corresponding Placement Analysis Results |
| FT = 1 node failure | N1 fails | N2 runs {D, A}; N3 runs {B, C, E} |
| FT = 1 node failure | N2 fails | N1 runs {A, B, E}; N3 runs {C, D} |
| FT = 1 node failure | N3 fails | N1 runs {A, B, E}; N2 runs {C, D} |
| FT = 2 node failure | N1 and N2 fails | No feasible solution over surviving N3 only |
| FT = 2 node failure | N1 and N3 fails | No feasible solution over surviving N2 only |
| FT = 2 node failure | N2 and N3 fails | No feasible solution over surviving N1 only |

Specifically, the acts carried out in state 326 serve the function of placement scenario selection. Still more specifically, the acts carried out in state 326 serve to apply any number of quantitative thresholds and/or optimization functions to the feasible solutions generated in state 324. When at least some of the feasible solutions have been scored and a "winning" (e.g., top-scoring) placement has been selected, then the state machine can move onward to state 326 that facilitates performance of the function of implementing the selected placement scenario. Once the selected placement has been implemented over the computing cluster, the state machine returns to state 304, where the cluster runs at least until there are sufficient conditions (e.g., occurrence of change events 306) to move to state 308.

Returning to the discussion of state 324, there are many possible optimization functions pertaining to any one or more of the foregoing quantitative measures. Moreover, such optimization functions can be applied to placements of any of a variety of types of virtualization system entities (e.g., not solely virtual machines). One example of placement scenarios pertaining to a variety of types of virtualization system entities is shown and described as pertains to FIG. 4.

Figure 4:
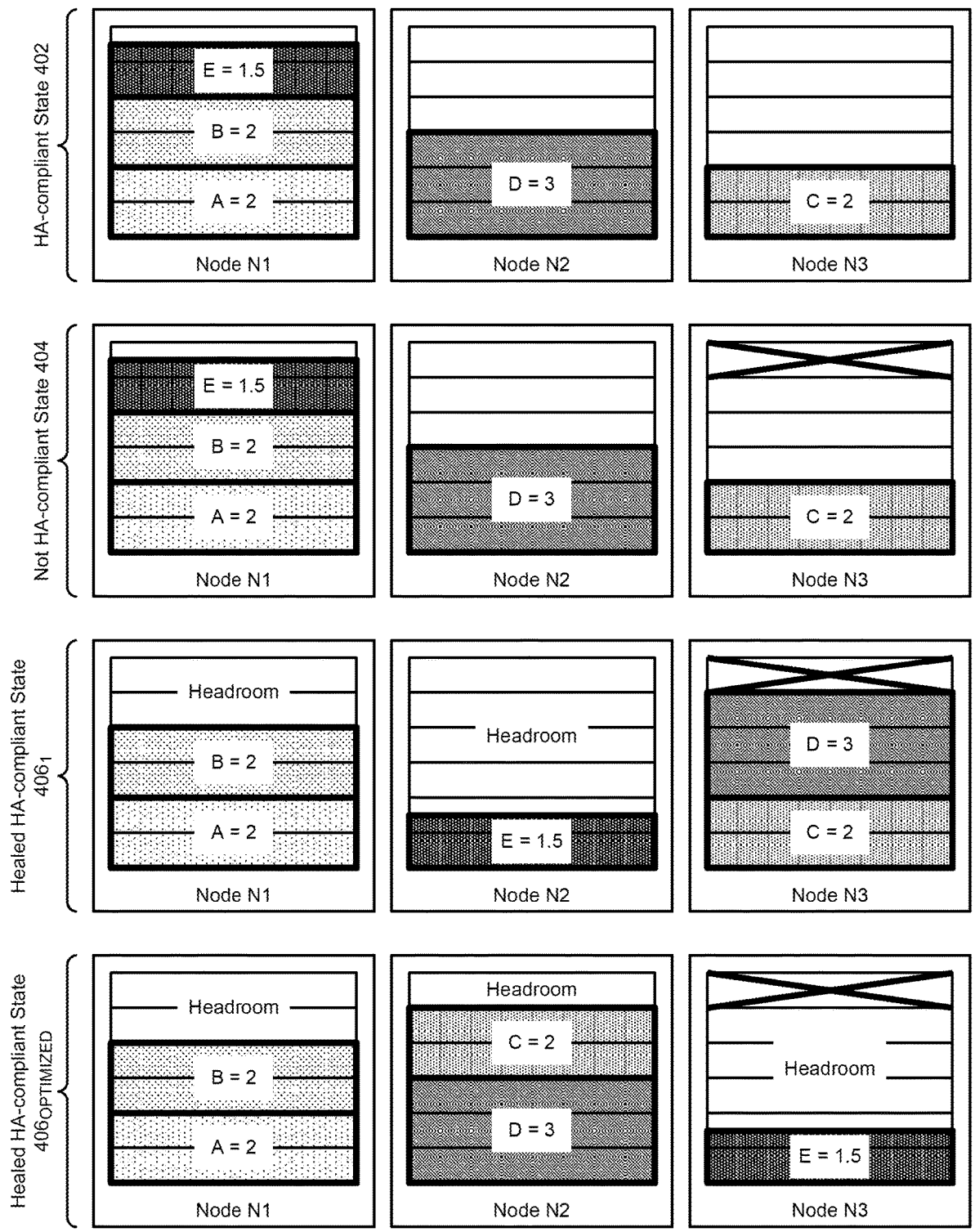
FIG. 4 illustrates an example healing scenario as may be implemented in systems that move virtualization system entities from one node to another node in response to a diminishment of computing resources, according to an embodiment.

FIG. 4 illustrates an example healing scenario as may be implemented in systems that move virtualization system entities from one node to another node in response to a diminishment of computing resources. As an option, one or more variations of healing scenario or any aspect thereof may be implemented in the context of the architecture and functionality of the embodiments described herein and/or in any environment.

This figure is being provided to illustrate how a change to the provisions of a node of a cluster can be accommodated (e.g., healed) so as to bring the computing cluster back into HA compliance. In this example, one of the nodes (e.g., node N3) of the three node cluster is reconfigured in a manner that reduces the extent of resources available to the computing entities. This reduction in the extent of resources available to the computing entities causes the computing cluster to move out of an HA compliant state 402 into a non-compliant state 404. The non-compliant state 404 is then healed to bring the cluster into a healed HA compliant state.

This particular example refers to computing entities by an alpha designations 'A', 'B', 'C', 'D', and 'E'. As shown by the HA compliant state 402, node N1 hosts computing entities 'A', 'B', and 'E'. Both 'A' and 'B' demand 2 units At some moment in time, the extent of resources available to a node might change. In this example, the extent of resources of node N3 is diminished from 6 units to 5 units. This diminishment makes takes the cluster out of HA compliance. By inspection, it can be seen that, in the event of a single node failure of node N1, there is no placement of computing entities 'A', '13', and 'E' onto node N2 and/or node N3. This is because at least 3.3 units of resources are required on either node N2 or node N3, however both node N2 and node N3 have only 3 units of resources available. There is no feasible placement directly from non-compliant state 404 to an HA-compliant state.

To remediate (e.g., heal) this situation and bring the computing cluster back into HA compliance, there are exactly two feasible placement scenarios, namely the one showing as healed HA-compliant state $406_1$, and the one showing as healed HA-compliant state $406_{OPTIMIZED}$. Continuing this example, the optimized solution of HA-compliant state $406_{OPTIMIZED}$ is preferred since a headroom requirement is satisfied. In this example, the specific headroom requirement that is satisfied is that every node has at least some amount of resource headroom. As shown, the alternative, namely healed HA-compliant state $406_1$, has at least one node of the cluster that has zero headroom, and therefore does not meet the specific headroom requirement. Of course, this and certain other objectives or requirements can be interpreted as optimization criteria in the form of a minimization objective threshold, a maximization objective threshold, or a constraint.

There are many ways to generate feasible placement scenarios and to apply optimization criteria to the generated feasible placement scenarios so as to resolve to one selected optimal placement scenario. In fact there are many different optimization criteria and/or many optimization minimization objectives and/or optimization maximization objectives. One non-limiting implementation involving virtual machine placements is shown and described as pertains to FIG. 5.

Figure 5:
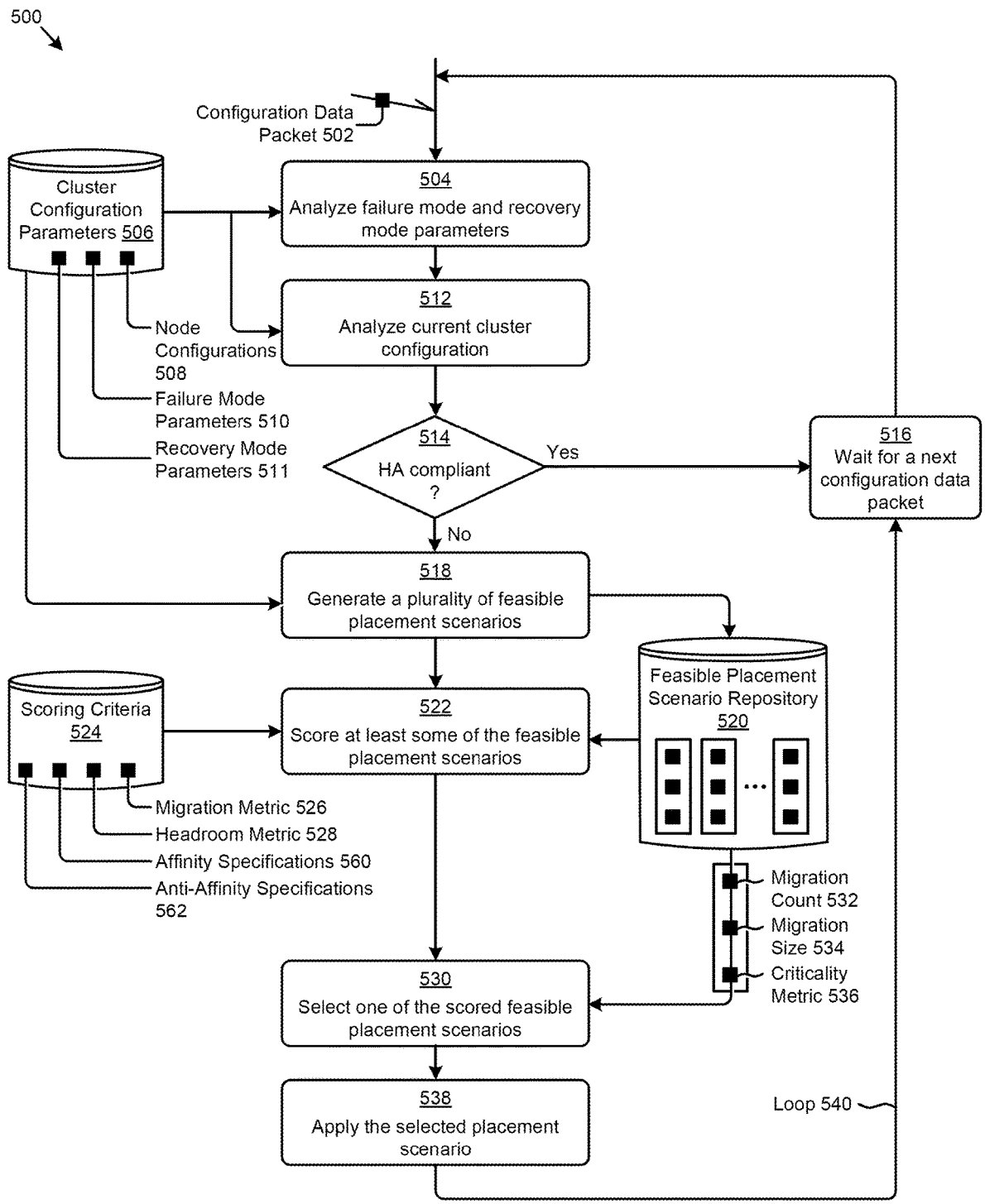
FIG. 5 is a flowchart depicting an example implementation of a VM placement optimization system, according to an embodiment.

FIG. 5 is a flowchart depicting an example implementation of a VM placement optimization system 500. More specifically, FIG. 5 is a flowchart depicting an example implementation of a VM placement optimization system for performing VM migrations continually. As an option, one or more variations of VM placement optimization system 500 or any aspect thereof may be implemented in the context of the architecture and functionality of the embodiments described herein and/or in any environment.

As shown, the flow commences upon occurrence of a configuration data packet 502. The contents of such a configuration data packet might include a codification of any change to the cluster—whether the change was caused by an administrative action (e.g., by an administrator changing failure mode parameters) or whether the change was caused by normal operation of the computing cluster. As one example, an administrator might change a failure mode parameter to indicate a higher degree of fault tolerance, such as by changing from a one-node fault tolerance mode to a two-node fault tolerance mode. As another example, a configuration data packet might contain information that a previously running VM has terminated, or that a new VM was started. Configuration data packets might be sent out as singletons, where each individual computing cluster change raises a new configuration data packet. Additionally or alternatively, configuration data packets might be sent out referring to batches of changes, where each batch refers to a plurality of contemporaneous computing cluster changes. In some cases, the codification of changes into batches results from application of one or more filters, which filters serve to reduce or eliminate codification of computing cluster changes that are unlikely to affect HA compliance.

As used herein, the term "failure mode parameters" refers to any aspect of the computing cluster that is at least potentially able to affect the operation of the computing cluster either before, during or after a failure event. In some implementations, the term "failure mode parameters" refers to numeric values that characterize, a number of nodes that constitute the computing cluster, a number of virtual machines that run on the computing cluster, or a fault tolerance setting.

Strictly as one illustrative embodiment, a set of cluster configuration parameters 506 may be maintained on an ongoing basis. Aspects of the cluster such as node configurations 508 (e.g., the memory capacity and/or CPU capabilities of particular nodes) can be initially populated into the cluster configuration parameters, and thereafter, as aspects of the nodes that constitute the computing cluster are varied, parameters that make up the node configurations are updated (or added or deleted). The set of cluster configuration parameters 506 may further comprise failure mode parameters 510. Such failure mode parameters, either singly or in combination, serve to define the semantics corresponding to requirements of HA compliance.

Strictly as one example, a set of failure mode parameters might be defined so as to carry the semantics of, "An HA-compliant computing cluster is one that requires that the set of computing entities running on any single node of the computing cluster can be restarted on other nodes of the computing cluster in the event of loss of the single node." As another example, an alternative set of failure mode parameters might be defined so as to carry the semantics of, "An HA-compliant computing cluster is one that requires that the set of computing entities running on any two nodes of the computing cluster can be restarted on other nodes of the computing cluster in event of loss of both of the two nodes." As still another example, a further alternative set of failure mode parameters might be defined so as to carry the semantics of, "An HA-compliant computing cluster is one that requires that the set of computing entities running on any one node of the computing cluster can be restarted on other nodes of the computing cluster in event of loss of the node AND where none of the computing entities running on the one other node of the computing cluster need be moved before the restart can be accomplished."

Additionally or alternatively, the aforementioned cluster configuration parameters 506 many include various recovery mode parameters 511. Such recovery mode parameters may be correlated to failure mode parameters, or such recovery mode parameters might carry semantics that themselves subsume the foregoing failure mode parameters. Strictly as an example of recovery mode parameters, a recovery mode parameter might refer to the maximum amount of time allowed for the restart. As another example, a recovery mode parameter might refer to a minimum configuration specification corresponding to a memory amount and/or CPU capability of a node that is used to replace a failed node.

The aforementioned failure mode and recovery mode parameters (e.g., as referenced in step 504) and the current cluster configuration (e.g., as referenced in step 512) can be analyzed (e.g., in a sequence or in parallel) so as to produce sufficient information to be able to make a determination as to whether or not the then-current configuration is HA compliant or not. If the determination is that the then-current configuration of the computing cluster is HA compliant, then the "Yes" branch of test 514 is taken and the VM placement optimization system 500 waits (e.g., at step 516) for a next configuration data packet. On the other hand, if the then-current configuration of the computing cluster is not HA compliant, then the "No" branch of test 514 is taken.

Step 518 serves to generate a plurality of feasible placement scenarios. The determination of what is or is not a feasible placement scenario can be based at least in part on the node configurations. At least some of the plurality of feasible placement scenarios are stored in a feasible placement scenario repository 520. In some cases, two or more feasible placement scenarios can be deemed to be logically equivalent and, in such cases, only one of the logically equivalent placement scenarios need be stored in the feasible placement scenario repository.

In this embodiment, at least some of the feasible placement scenarios are scored (step 522). As shown, scoring is based on various scoring criteria 524. Strictly as examples, such scoring criteria may include a migration metric 526 (e.g., a resource cost associated with a particular placement scenario) and/or a headroom metric 528 (e.g., a value or set of values that characterizes the amount of resource headroom associated with a particular placement scenario). In some embodiments, affinity specifications 560 are applied to a candidate placement scenario and if the affinity specification is not satisfied, then that candidate placement scenario is removed from further consideration. Similarly, in some embodiments, anti-affinity specifications 562 are applied to a candidate placement scenario and if the anti-affinity specification is not satisfied, then that candidate placement scenario is removed from further consideration.

As used herein, an affinity specification refers to a requirement that a virtual machine of a particular type must be placed onto a node having a minimum set of capabilities. Also as used herein, an anti-affinity specification refers to a requirement that a virtual machine of a particular type may not be placed onto a particular node or node type. For example, a compute-intensive application must not be placed onto a storage-only node.

In some cases, a score can refer to how (e.g., to what extent) a particular placement scenario achieves a constraint. For example, if there were a constraint referring to a maximum number of migrations needed, and a particular placement scenario requires more than that maximum number of migrations to be applied, then that placement scenario might take on a value of "Over" to indicate that that scenario would breach that constraint. Of course, the foregoing is merely an example, and there can be many constraints and/or types of constraints. Strictly as one further scenario involving a constraint, consider a migration plan that has dependencies between VMs such that a certain set of VMs are to be migrated first before a second set of VMs are migrated. Further consider that there may be a plurality of differing placement scenarios that nevertheless do satisfy the dependencies. In such a case, an optimization minimization function can be defined such that feasible placement scenarios that have shorter dependency chains are preferred over feasible placement scenarios that have longer dependency chains.

At step 530, a plurality of feasible placement scenarios are considered so as to select one of them. As aforementioned, at least some of the feasible placement scenarios in the feasible placement scenario repository 520 have been scored. Such scoring might associate multiple values to a particular feasible placement scenario. In some embodiments, and as shown, each scored feasible placement scenario is associated with a migration count 532, a migration size 534, and a criticality metric 536. The foregoing multiple values associated with a particular feasible placement scenario can be used in downstream processing such as for selecting an optimal placement scenario from among a larger set of feasible placement scenarios. In some embodiments, selecting an optimal placement relies on solving an optimization problem involving constraints and a quantitative optimization function. Any of the foregoing scoring criteria and/or cluster configuration parameters can be recast so as to be reused as parameters that define constraints or as parameters that are used in calculation of an optimization function.

When one of the scored feasible placement scenarios (possibly an optimal placement scenario) has been selected (step 530), then the selected placement scenario is applied to the cluster (step 538) and processing loops back (via loop 540) to step 516. A further pass through the flow of the VM placement optimization system commences upon receipt of a next occurrence of a configuration data packet.

There are many ways to implement the functionality of the system of FIG. 5. More particularly, there are many ways to partition the functions of cluster configuration monitoring, as well as the functions of making changes to the configuration of the cluster. One possible partitioning to implement the functionality of the system shown in FIG. 5 is now briefly discussed.

Figure 6:
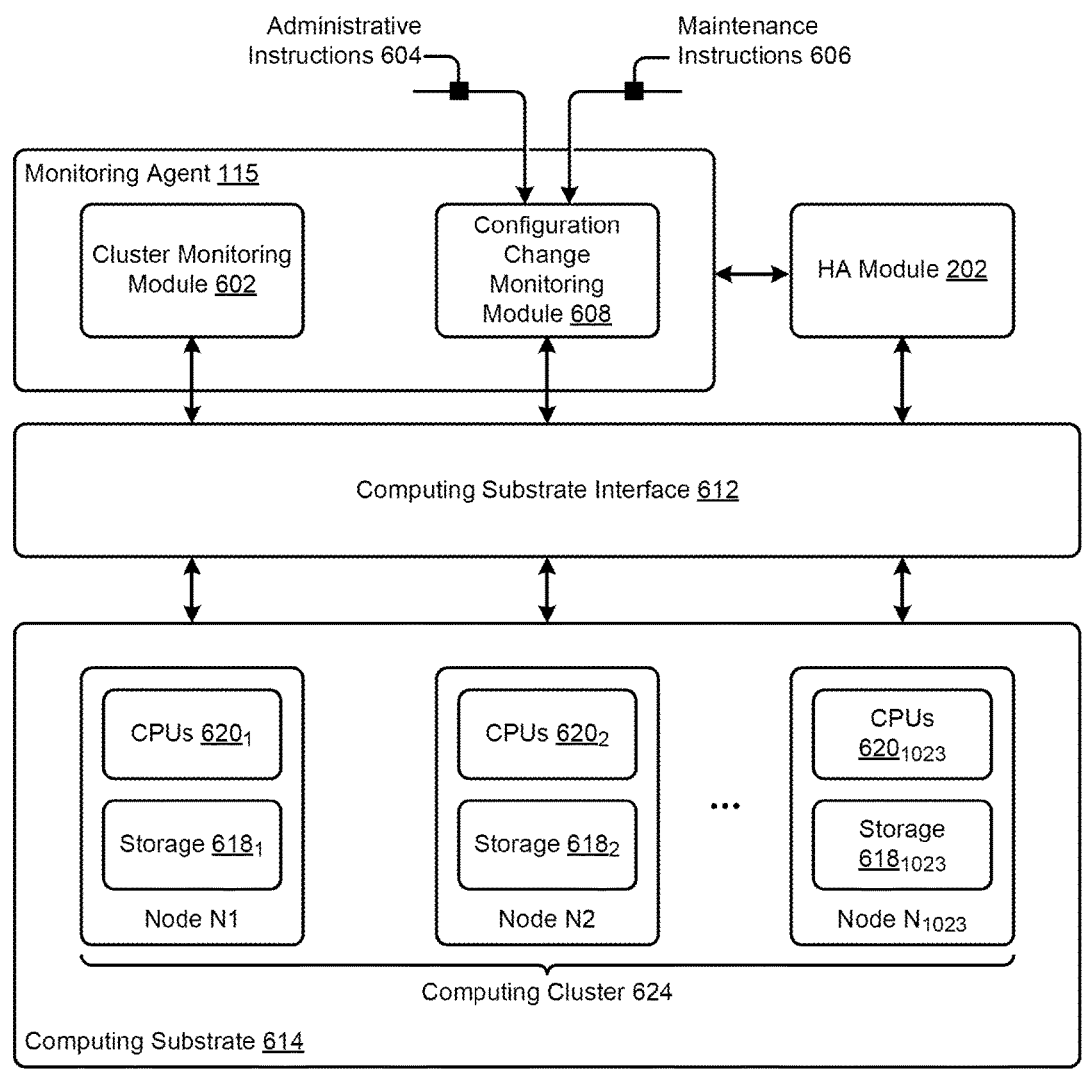
FIG. 6 is a system diagram depicting a dynamic healing system that performs VM migrations continually in advance of a failure event to achieve an optimized high-availability VM placement, according to an embodiment.

FIG. 6 is a system diagram depicting a dynamic healing system 600 that performs VM migrations continually in advance of a failure event to achieve an optimized high-availability VM placement. As an option, one or more variations of dynamic healing system 600 or any aspect thereof may be implemented in the context of the architecture and functionality of the embodiments described herein and/or in any environment.

The shown partitioning is merely one example of how to partition the functions of cluster configuration monitoring, as well as the functions of making changes to the configuration of the cluster. This specific embodiment is agnostic to the makeup of the computing substrate 614. Moreover, the specific embodiment is agnostic to the makeup of the any node (e.g., node $N_1$, node $N_2$, . . . , node $N_{1023}$) of the computing cluster 624. As shown, the plurality of nodes that make up the computing cluster are configured with respective CPUs (e.g., CPUs $620_1$, CPUs $620_2$, . . . , CPUs $620_{1023}$) and respective node-local storage (e.g., storage $618_1$, storage $618_2$, . . . , storage $618_{1023}$).

Configuration of the computing cluster as a whole, as well as configuration of the individual nodes that comprise the computing cluster, can be performed via the shown computing substrate interface 612. The computing substrate interface can use any known method to make changes to the configuration of the computing cluster as a whole and/or to make changes to the configuration of the individual nodes that comprise the computing cluster. Strictly as one example, the computing substrate interface can interact with the computing substrate via application programming interfaces (APIs). The computing substrate interface can sequentially or concurrently send/receive data to/from the computing substrate. As such, conditions of the computing substrate can be monitored on an ongoing basis.

In this example embodiment, a cluster monitoring module 602 serves to continually monitor changes that occur in the computing substrate. Such a cluster monitoring module can poll the computing substrate (e.g., via the computing substrate interface) or the cluster monitoring module can receive advice of various changes that had been made to the computing substrate. Also, as shown in this example embodiment, a configuration change monitoring module 608 serves to continually monitor (1) changes that might occur in response to processing of administrative instructions 604 and/or (2) changes that might occur in response to processing of maintenance instructions 606. In some cases, a maintenance instruction might include instructions to 'take down' a particular node so as to perform maintenance operations on that node while it is 'down'. In the situation that the computing cluster is in an HA-compliant state, and in the situation that fault tolerance (FT) parameter is set to handle a single node failure (e.g., at least FT=1), then the effect of taking down a node for maintenance is now worse than if the computing cluster had lost that node for a reason other than for maintenance.

The aforementioned modules (e.g., cluster monitoring module 602, configuration change module 608, and HA module 202) can interoperate with each other over an inter-module communication protocol. An example of such an inter-module communication protocol is shown and described as pertains to FIG. 7.

Figure 7:
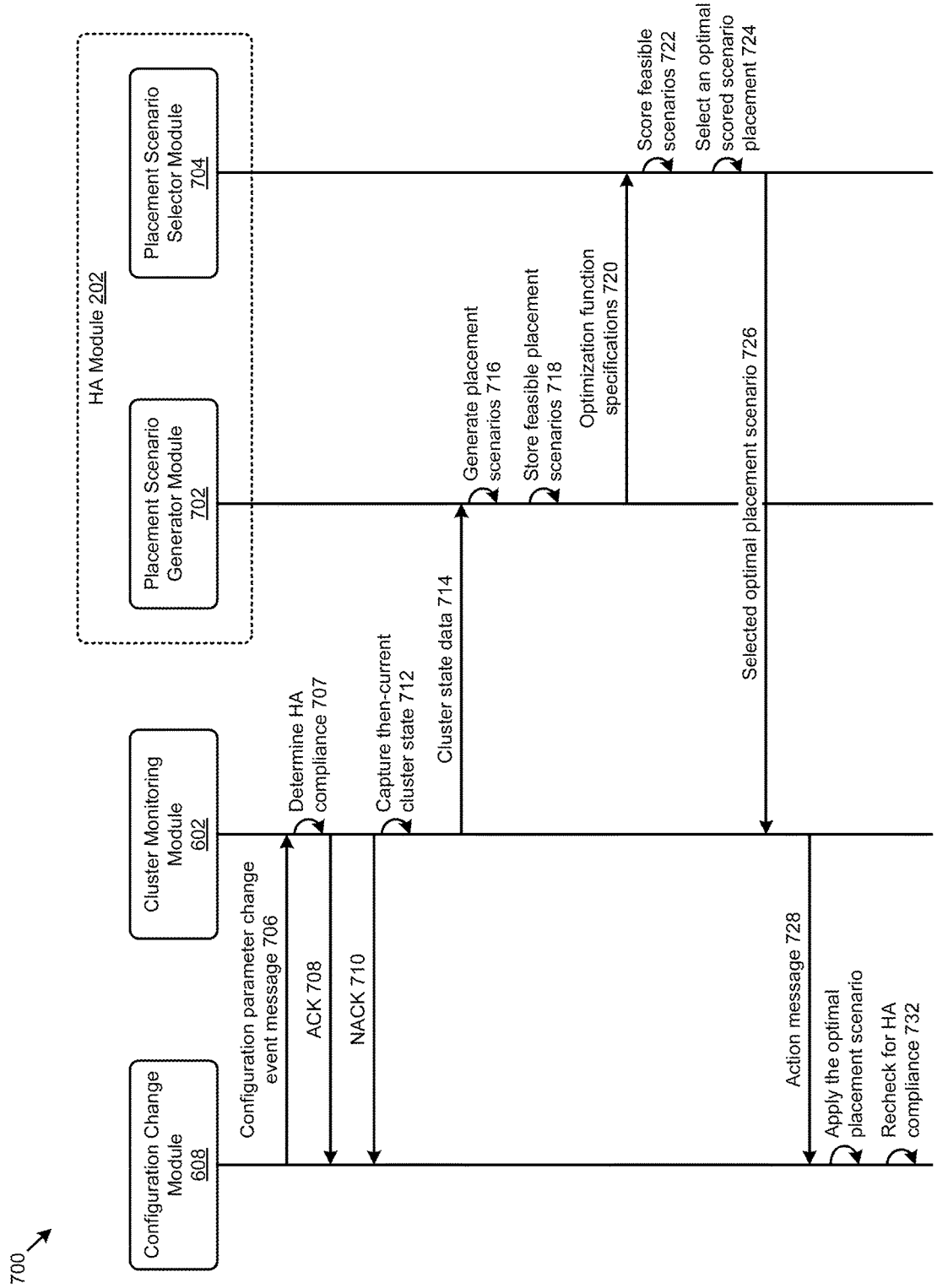
FIG. 7 illustrates an example inter-module communication protocol as used in systems that perform computing entity migrations continually to achieve an optimized high-availability computing entity placement, according to an embodiment.

FIG. 7 illustrates an example inter-module communication protocol 700 as used in systems that perform computing entity migrations continually to achieve an optimized high-availability computing entity placement. As an option, one or more variations of inter-module communication protocol 700 or any aspect thereof may be implemented in the context of the architecture and functionality of the embodiments described herein and/or in any environment.

This figure is being presented to illustrate how a computing entity placement optimization system can be implemented by partitioning the overall functionality of a computing entity placement optimization system across several modules. More specifically, the figure is being presented to show a possible protocol for inter-module communications.

As shown, the protocol for inter-module communications commences when configuration change module 608 recognizes a configuration parameter change event. The configuration change module responds to the configuration parameter change event by sending a configuration parameter change message 706 to cluster monitoring module 602. The cluster monitoring module in turn sets about to determine if the then-current placement of computing entities in the computing cluster is in HA compliance 707. If the then-current state of the computing cluster is deemed to be HA compliant, then an acknowledgement (e.g., ACK 708) is sent back to the configuration change module. On the other hand, if the then-current state of the computing cluster is deemed to be not HA compliant, then a negative acknowledgement (e.g., NACK 710) is sent back to the configuration change module and contemporaneously, the cluster monitoring module sets about to capture any then-current cluster state 712 that might be needed by the HA module. After such a then-current cluster state capture has been at least partially accomplished and sent to the HA module (step 714), a dynamic scheduler (e.g., the shown placement scenario generator module 702) commences to generate placement scenarios 716 that satisfy the HA requirements over the then-current cluster state. Such a dynamic scheduler can be configured in myriad way, in some embodiments, an HA compliance checker is embedded within the dynamic scheduler.

When exhaustively generating all possible placement scenarios, there may be many such placement scenarios that back to the cluster monitoring module, which relays the selected optimal placement scenario, possibly together with an action message 728, to the configuration change module. The configuration change module processes the action message, thereby applying the selected optimal placement scenario over the computing cluster. HA compliance of the computing cluster after applying the selected optimal placement scenario over the computing cluster is again checked (step 732) and committed. The configuration change module then waits to receive a next change event.

Of course there are many variations to this protocol, including protocols that commence upon detection of a change to any one or more cluster configuration parameters, including changes to the hardware of the computing cluster itself or changes to the software of the computing cluster. Strictly as example, Table 5 presents example of cluster configuration parameters.

TABLE 5

Example cluster configuration parameters

| Cluster Configuration Parameter | Domain | Possible Semantics |
| --- | --- | --- |
| Number of Nodes | Hardware | The number of nodes that are assigned to a particular portion of a contiguous address range that spans the nodes of the cluster |
| Number of Cores (per Node) | Hardware | Number of CPU cores for a particular node |
| Allocable Memory (per Node) | Hardware | Amount of memory available to a guest operating system and/or to virtualized computing entities |
| Allocable Memory (per VM) | Hardware/Software | Allocates a greater or lesser amount of memory available to a VM or other virtualized computing entities |
| Number of virtual machines (per Node) | Hardware/Software | Number of virtual machines assigned to a particular node |
| Headroom (per Node) | Hardware/Software | Amount of memory available to a guest operating system and/or to virtualized computing entities minus the amount of memory demanded by running VMs |
| Network Bandwidth Demand (per Node) | Hardware/Software | Amount of network bandwidth demanded by a guest operating system of a node and/or by virtualized computing entities on that node | are not feasible. Those placement scenarios are discarded. On the other hand, when placement scenario generator 702 does produce a feasible placement scenario, then operations of the placement scenario generator serve to store just the feasible placement scenarios 718. Of course, in other embodiments, it is possible that placement scenario generator 702 streams feasible placement scenarios to downstream processing rather than storing the feasible placement scenarios.

One or more optimization function specifications 720 are sent to placement scenario selector module 704. The placement scenario selector module can apply any information of the optimization function specifications to any number of feasible placement scenarios so as to score the feasible placement scenarios to come up with one or more 'winners'. More specifically, the shown operation to score feasible scenarios 722 can use information of the optimization function specifications to formulate a constraint-bounded optimization minimization or maximization problem, which in turn is solved to result in a score. Different use cases might have correspondingly different optimization constraints and/or minimization objective functions and/or maximization objective functions.

Operation 724 serves to select an optimal scored scenario placement. When a winning placement scenario is identified, then that selected optimal placement scenario 726 is sent As is understood by those of skill in the art, there can be many feasible placement scenarios that are equivalent and/or share the same numeric score. One possible technique for tiebreaking is shown and described as pertains to FIG. 8.

Figure 8:
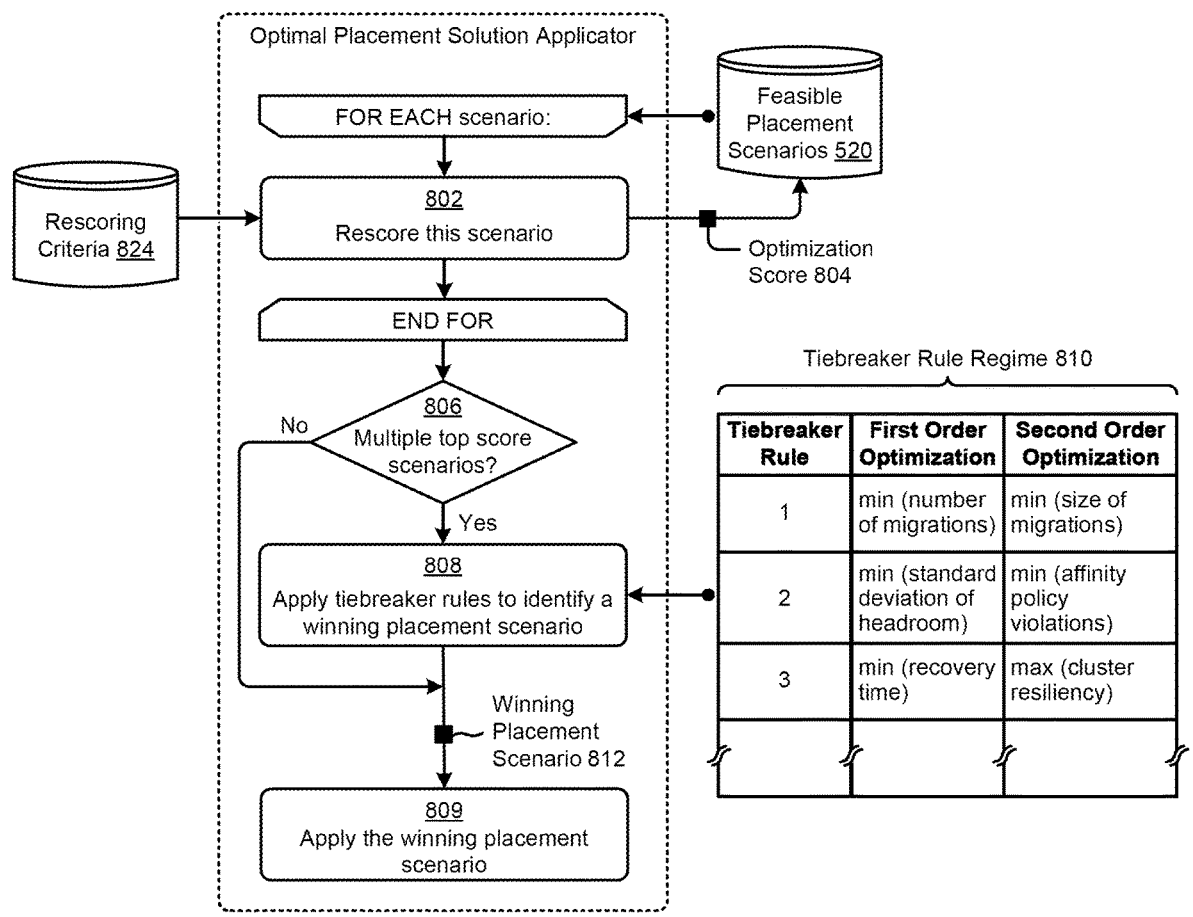
FIG. 8 is an illustrative flowchart depicting a tiebreaking technique as may be implemented in systems that move virtualization system entities from one node to another node in advance of a failure event to achieve an optimized high-availability VM placement, according to an embodiment.

FIG. 8 is an illustrative flowchart depicting a tiebreaking technique as may be implemented in systems that move virtualization system entities from one node to another node in advance of a failure event to achieve an optimized high-availability VM placement. As an option, one or more variations of dynamic healing technique 800 or any aspect thereof may be implemented in the context of the architecture and functionality of the embodiments described herein and/or in any environment.

The figure is being presented to explain how a potentially large number of placement scenarios can be scored and/or rescored with respect to one or more optimization functions and/or with respect to one or more constraints. In the particular shown embodiment, each of the feasible scenarios are rescored however, in various alternative embodiments, certain of the feasible placement scenarios can be eliminated from consideration rather than being considered for rescoring. Strictly as one example, there might be a potentially large number of feasible placement scenarios that are merely permutations of a particular combination. This can happen in situations that have a large amount of aggregate headroom, and/or when there are many nodes in the cluster. To illustrate, consider a first placement scenario that moves VM1 from N1 to N2. There might be a similar placement scenarios that are merely permutations of the first placement scenario, such as permutations that move VM1 from N1 to N3, and still further >1000 permutations that move VM1 from N1 to [N4, N5, N6, . . . N1023], etc. The foregoing permutations derive from the combination of moving VM1 from N1 to any other node, and as such, all equivalent permutations except one can be eliminated from consideration for rescoring. This reduces the demand for computing power to identify an optimal placement scenario.

There can be an individual value for each individual optimization function and/or there can be an individual value for each constraint. In some cases, an overall optimization score 804 is produced, which overall optimization score is used to rank the rescored placement scenarios. The rescoring is accomplished by step 802, which rescoring step takes as input (1) a placement scenario and (2) a set of rescoring criteria 824. For each considered scenario, the rescoring step outputs an optimization score 804, at least some of which optimization scores are stored (e.g., in the storage area labeled as feasible placement scenarios 520) for subsequent consideration. In some cases, only the placement scenarios that share a winning score need to be stored. The winning score may change as more placement scenarios are rescored.

At decision 806, a test is made to determine if there are multiple placement scenarios that achieve the same winning score. If there are indeed multiple placement scenarios that achieve the same winning score, then at least some of those multiple placement scenarios that achieve the same winning score are further considered with respect to a tiebreaker rule regime 810. Each tiebreaker rule comprises a primary optimization function and a secondary optimization function. In some cases there is a tertiary optimization function and so on.

As shown, a tiebreaker regime might include a first order optimization tiebreaker rule and a second order optimization tiebreaker rule. A second order optimization tiebreaker rule can be invoked when the first order optimization tiebreaker rule still fails to break the tie. Strictly as an example, a tiebreaker rule might comprise a determination of which of two feasible placement scenarios would incur fewer VM migrations to accomplish the placement. As another example, a tiebreaker rule might comprise a determination of which of two feasible placement scenarios would incur a shorter recovery time in event of a node failure. The first and second optimization tiebreaker rules can be applied whenever there are multiple top score scenarios. More specifically, when there are multiple top score scenarios, then the "Yes" branch of decision 806 is taken and the processing flow enters into step 808, which applies the tiebreaker rules in order to identify a winning placement scenario (e.g., the shown winning scenario 812). After tiebreaking (e.g., when a single winning placement scenario has been identified), that winning placement scenario is applied over the running computing cluster (step 809). The running computing cluster continues to run in an HA-compliant state. If a failure event occurs while the computing cluster is running in this HA-compliant state, then the computing elements (e.g., VMs) of the failed node(s) are restarted on the surviving nodes.

Continuous Monitoring

As is now understood, if a failure event occurs while the computing cluster is running in an HA-compliant state, then the computing elements of the failed node(s) are restarted on the surviving nodes of the running computing cluster. So long as the computing cluster is running, it is possible that the computing cluster might diverge from HA compliance, even in absence of a user- or administrator-initiated configuration change. This can happen, for example, if/when a first VM spawns a second, new VM on a node of the cluster. Additionally or alternatively, this can happen if a node undergoes some maintenance operation that changes amount (s) or type(s) of resources available. For example, a maintenance operation might be removal of a node of the cluster, or might be addition of a node to the cluster. Again, this can happen even in absence of a user- or administrator-initiated configuration change.

In some cases, a particular configuration change may be rejected because the proposed configuration change, if applied, would take the computing cluster out of HA compliance. As such, a continual monitoring facility (e.g., monitoring agent 115) is configured to be able to detect changes that are imposed on the system, regardless of the origination of the configuration change. As such, a continual monitoring facility need not be a part of, and need not rely on, any aspects of the HA agent. For example, and continuing the previous example, a certain amount of memory of a node might be decommissioned on a particular node, thereby reducing the memory footprint of that node. Such a memory footprint reduction might originate from, or be relayed from, a hypervisor of a virtualization system. In some embodiments, a continual monitoring facility is provisioned as a function of a hypervisor. In some embodiments, a plurality of node-specific instances of certain portions of the monitoring facility are distributed across all nodes that constitute the computing cluster. In some embodiments, at least some of the plurality of node-specific instances are in a one-to-one correspondence with node-specific virtualization system modules (e.g., hypervisors).

Divergence out of an HA-compliant state can happen if the cluster itself undergoes some operation that reduces the number of nodes. To accommodate the possibility of such changes, a cluster monitor (e.g., the heretofore discussed cluster monitoring module 602) can continuously observe changes that occur on the computing cluster. Such cluster monitoring can be implemented to comport with a "sidecar" architecture, where a cluster monitor module runs on a system separate from the computing cluster being observed. Additionally or alternatively, cluster monitoring can be accomplished via the agency of a computing cloud vendor. A cloud vendor might offer a set of configuration change application programming interfaces (APIs).

Strictly as one example of such APIs, a public cloud vendor might advertise access to a series of callback functions that are invoked whenever the cloud vendor receives a request to modify the configuration of a resource of the computing substrate. As such, even in a vendor-specific cloud setting, it is possible to detect a change to the failure mode parameter as well as to detect a change to other configuration parameters of the cloud-resident multi-node computing cluster. Upon detection of a change that could at least potentially cause the computing cluster to diverge from its then-current HA-compliant state, analysis of the then-current virtual machine placement configuration of the multi-node computing cluster is undertaken so as to determine at least one new alternate feasible virtual machine placement that would at least potentially satisfy any of the then-current high-availability requirements that apply to the computing cluster. As such, HA-compliance of a computing cluster can be maintained over time, even in the face of changing parameters and/or a changing constituency of the computing cluster.

Any of the functionality of any of the embodiments heretofore described can be implemented, in whole or in part, within a virtualized environment. More specifically, any of the functionality of any of the modules or embodiments heretofore described can be implemented, in whole or in part, within one or more virtualized controllers. Variations of such virtualized environments as well as variations of such virtualized controllers are now discussed.

System Architecture Overview

Additional System Architecture Examples

All or portions of any of the foregoing techniques can be partitioned into one or more modules and instanced within, or as, or in conjunction with, a virtualized controller in a virtual computing environment. Some example instances of virtualized controllers situated within various virtual computing environments are shown and discussed as pertains to FIG. 9A, FIG. 9B, FIG. 9C, and FIG. 9D.

Figure 9A:
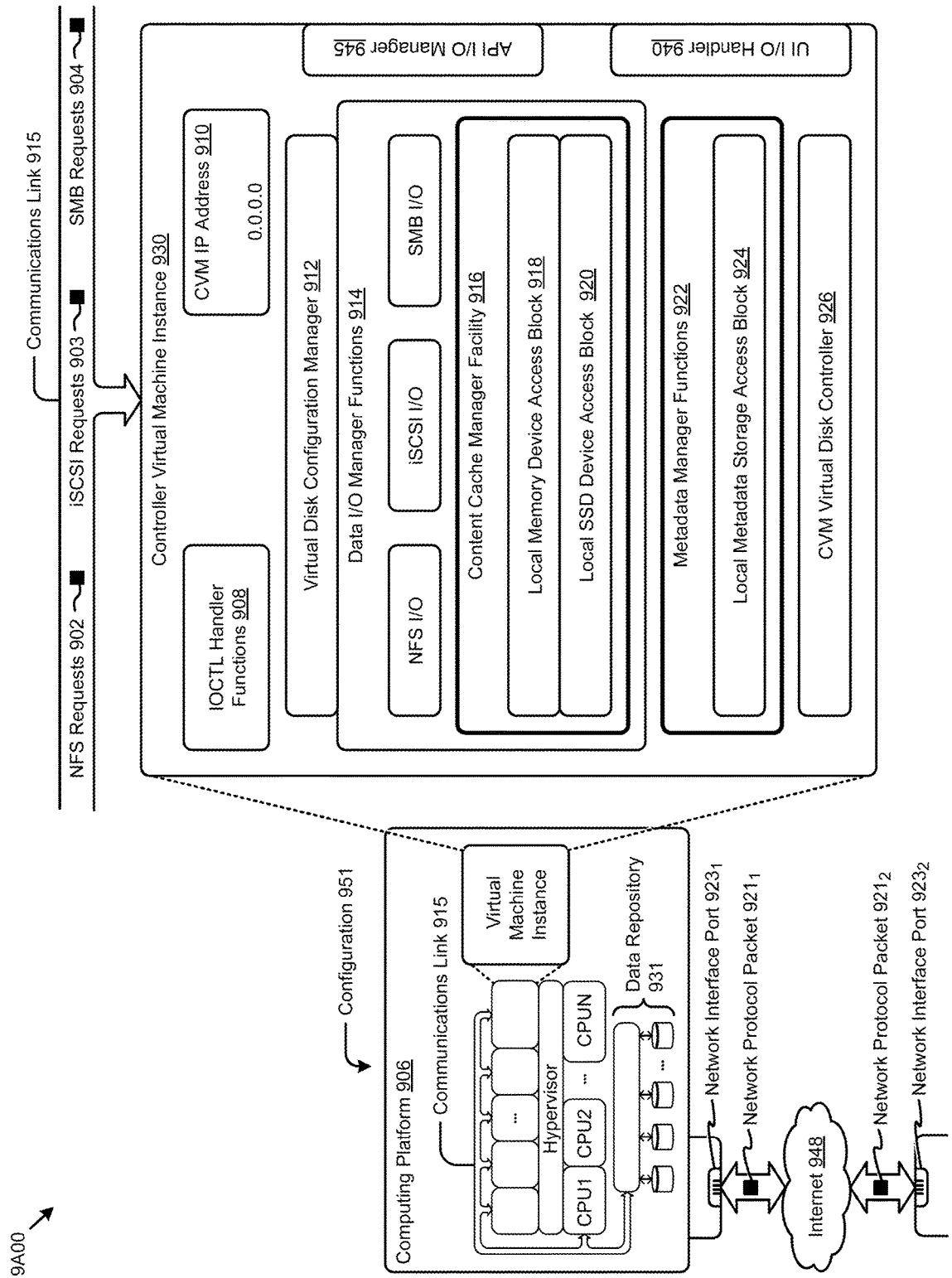
FIG. 9A, FIG. 9B, FIG. 9C, and FIG. 9D depict virtualization system architectures comprising collections of interconnected components suitable for implementing embodiments of the present disclosure and/or for use in the herein-described environments.

FIG. 9A depicts a virtualized controller as implemented in the shown virtual machine architecture 9A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines are configured for processing of storage inputs or outputs (I/O or IO) as received from any or every source within the computing platform. An example implementation of such a virtual machine that processes storage I/O is depicted as 930.

In this and other configurations, a controller virtual machine instance receives block I/O storage requests as network file system (NFS) requests in the form of NFS requests 902, and/or internet small computer system interface (iSCSI) block input-output requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output can be handled by one or more IO control (IOCTL) handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports input or output (TO) of any form (e.g., block IO, streaming IO) and/or packet-based IO such as hypertext transport protocol (HTTP) traffic, etc., through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 931, which in turn can be formatted into any one or more storage areas, and which can comprise parameterized storage accessible by a key (e.g., a filename, a table name, a block address, an offset address, etc.). Data repository 931 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 924. The data repository 931 can be configured using CVM virtual disk controller 926, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, . . . , CPUN). According to certain embodiments of the disclosure, two or more instances of configuration 951 can be coupled by communications link 915 (e.g., backplane, local area network, public switched telephone network, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port 9231 and network interface port 9232). Configuration 951 can be addressed through one or more network interface ports using an IP address. Any operational element within computing platform 906 can perform sending and receiving operations using any of a range of network protocols, possibly including network protocols that send and receive packets (e.g., network protocol packet 9211 and network protocol packet 9212).

Computing platform 906 may transmit and receive messages that can be composed of configuration data and/or any other forms of data and/or instructions organized into a data structure (e.g., communications packets). In some cases, the data structure includes program instructions (e.g., application code) communicated through the Internet 948 and/or through any one or more instances of communications link 915. Received program instructions may be processed and/or executed by a CPU as it is received and/or program instructions may be stored in any volatile or non-volatile storage for later execution. Program instructions can be transmitted via an upload (e.g., an upload from an access device over the Internet 948 to computing platform 906). Further, program instructions and/or the results of executing program instructions can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to performing VM migrations in advance of a failure event to achieve VM placement for high-availability on a non-empty cluster. In some embodiments, a module may include one or more state machines and/or combinational logic used to implement or facilitate the operational and/or performance characteristics pertaining to performing VM migrations in advance of a failure event to achieve VM placement for high-availability on a non-empty cluster.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing VM migrations). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to performing VM migrations to achieve a high-availability VM placement and/or for improving the way data is manipulated for achieving a high availability placement of VMs before occurrence of a failure event.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 9B:
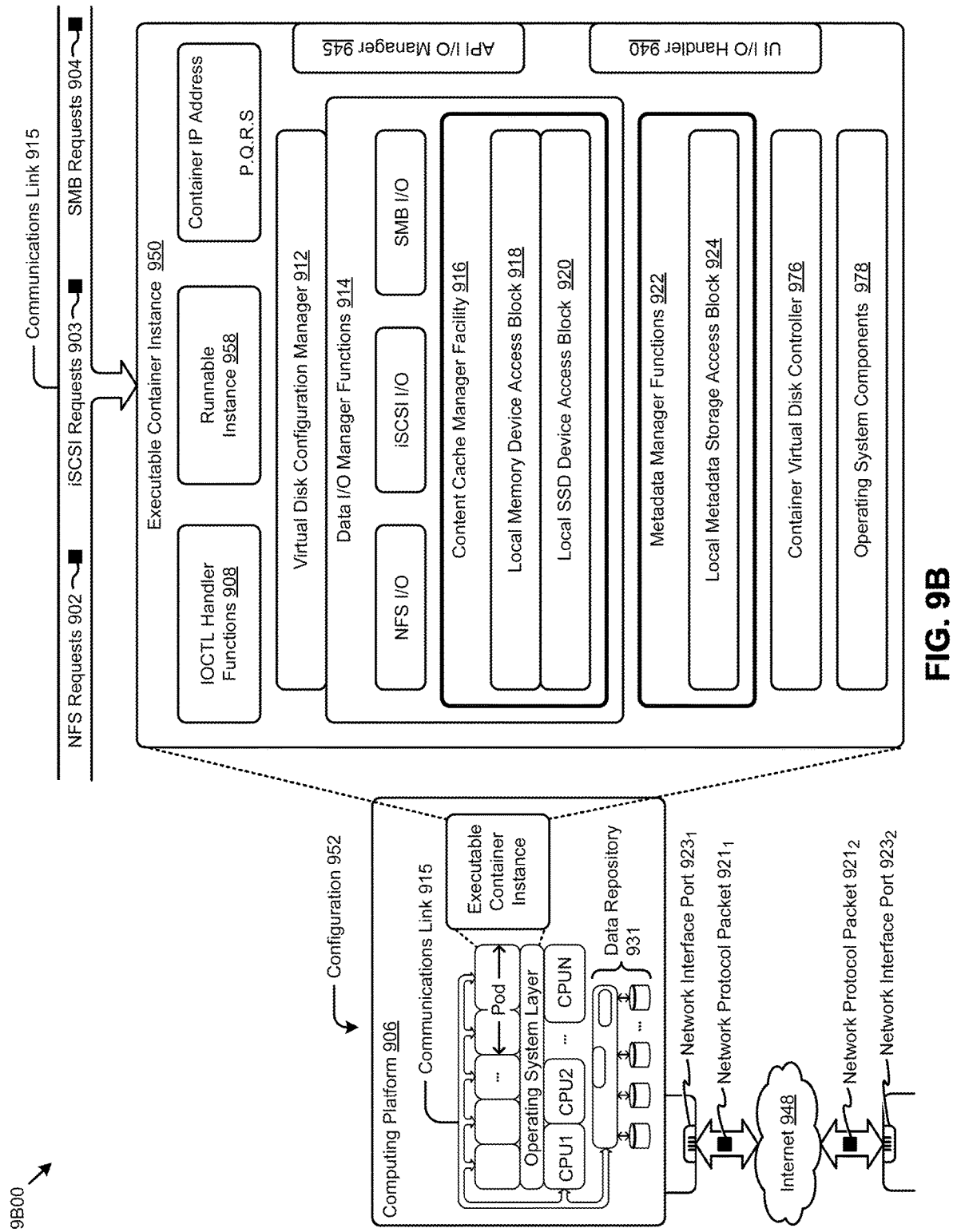

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to executable container instance 950. Configuration 952 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
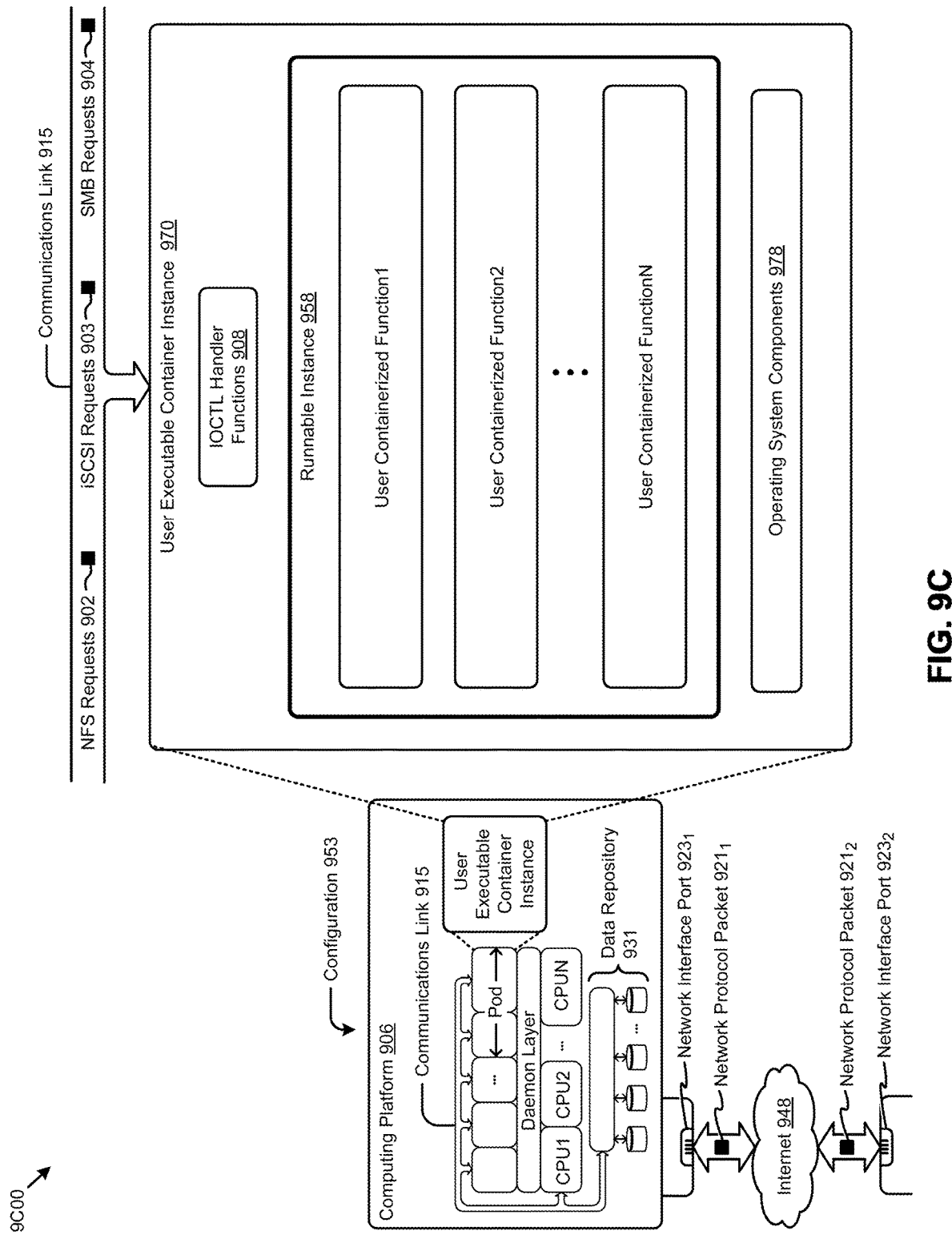

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture includes a user executable container instance in configuration 953 that is further described as pertaining to user executable container instance 970. Configuration 953 includes a daemon layer (as shown) that performs certain functions of an operating system.

User executable container instance 970 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 970.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage where the tiers of storage might be formed using the shown data repository 931 and/or any forms of network accessible storage. As such, the multiple tiers of storage may include storage that is accessible over communications link 915. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 9D:
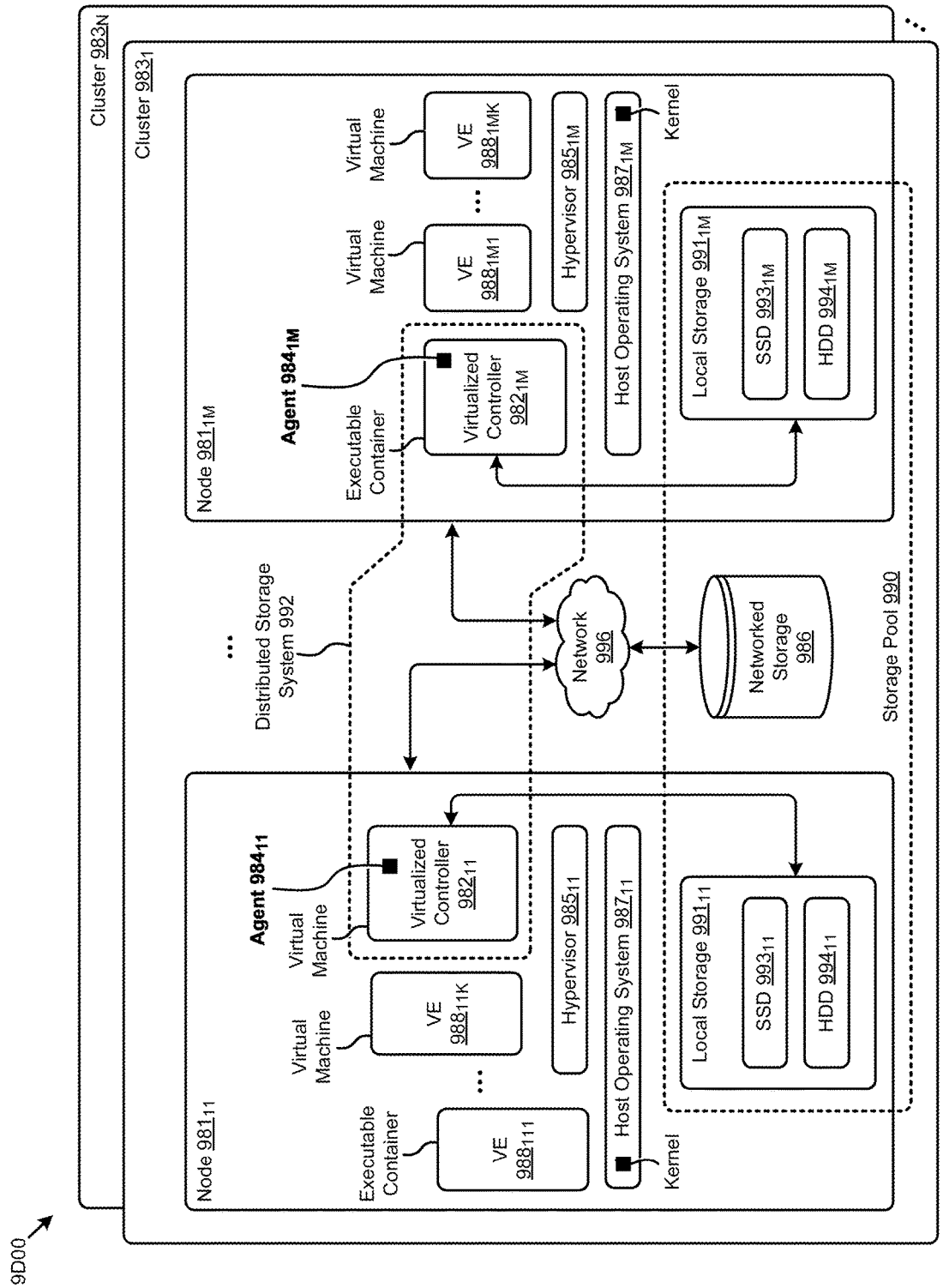

FIG. 9D depicts a distributed virtualization system in a multi-cluster environment 9D00. The shown distributed virtualization system is configured to be used to implement the herein disclosed techniques. Specifically, the distributed virtualization system of FIG. 9D comprises multiple clusters (e.g., cluster $983_1$, . . . , cluster $983_N$) comprising multiple nodes that have multiple tiers of storage in a storage pool. Representative nodes (e.g., node $981_{11}$, . . . , node $981_{1M}$) and storage pool 990 associated with cluster $983_1$ are shown. Each node can be associated with one server, multiple servers, or portions of a server. The nodes can be associated (e.g., logically and/or physically) with the clusters. As shown, the multiple tiers of storage include storage that is accessible through a network 996, such as a networked storage 986 (e.g., a storage area network or SAN, network attached storage or NAS, etc.). The multiple tiers of storage further include instances of local storage (e.g., local storage $991_{11}$, . . . , local storage $991_{1M}$). For example, the local storage can be within or directly attached to a server and/or appliance associated with the nodes. Such local storage can include solid state drives (SSD $993_{11}$, . . . , SSD $993_{1M}$), hard disk drives (HDD $994_{11}$, . . . , HDD $994_{1M}$), and/or other storage devices.

As shown, any of the nodes of the distributed virtualization system can implement one or more user virtualized entities (VEs) such as the virtualized entity (VE) instances shown as VE $988_{111}$, . . . , VE $988_{11K}$, VE $988_{1M1}$, . . . VE $988_{1MK}$), and/or a distributed virtualization system can implement one or more virtualized entities that may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $987_{11}$, . . . , host operating system $987_{1M}$), while the VMs run multiple applications on various respective guest operating systems. Such flexibility can be facilitated at least in part by a hypervisor (e.g., hypervisor $985_{11}$, hypervisor $985_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $987_{11}$, . . . , host operating system $987_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 990 by the VMs and/or the executable containers.

Multiple instances of such virtualized controllers can coordinate within a cluster to form the distributed storage system 992 which can, among other operations, manage the storage pool 990. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $981_{11}$ can interface with a controller virtual machine (e.g., virtualized controller $982_{11}$) through hypervisor $985_{11}$ to access data of storage pool 990. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 992. For example, a hypervisor at one node in the distributed storage system 992 might correspond to software from a first vendor, and a hypervisor at another node in the distributed storage system 992 might correspond to a second software vendor. As another virtualized controller implementation example, executable containers can be used to implement a virtualized controller (e.g., virtualized controller $982_{1M}$) in an operating system virtualization environment at a given node. In this case, for example, the virtualized entities at node $981_{1M}$ can access the storage pool 990 by interfacing with a controller container (e.g., virtualized controller $982_{1M}$) through hypervisor $985_{1M}$ and/or the kernel of host operating system $987_{1M}$.

In certain embodiments, one or more instances of an agent can be implemented in the distributed storage system 992 to facilitate the herein disclosed techniques. Specifically, agent $984_{11}$ can be implemented in the virtualized controller $982_{11}$, and agent $984_{1M}$ can be implemented in the virtualized controller $982_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions to the foregoing technical problems can be brought to bear through implementation of any one or more of the foregoing techniques.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts comprising:

storing one or more failure mode parameters that define a high-availability requirement of a multi-node computing cluster, wherein the high-availability requirement comprises a requirement that one or more virtual machines on a respective node can be placed on one or more other nodes in the multi-node computing cluster in an event of a failure of the respective node;

executing a cluster monitor process that detects changes on the multi-node computing cluster; and analyzing, in response to a detection of a change on the multi-node computing cluster corresponding to the high-availability requirement, a then-current virtual machine placement configuration of the multi-node computing cluster to determine at least a first alternate feasible virtual machine placement and a second alternate feasible virtual machine placement that both satisfy the high-availability requirement in spite of failure of one or more nodes of the multi-node computing cluster, wherein:

the first alternate feasible virtual machine placement comprises a first number of VM migrations, the second alternate feasible virtual machine placement comprises a second number of VM migrations, and the first alternate feasible virtual machine placement is selected wherein the first number of VM migrations for the first alternate feasible virtual machine placement is less than the second number of VM migrations for the second alternate feasible virtual machine placement.

2. The non-transitory computer readable medium of claim 1, further comprising instructions which, when stored in memory and executed by the processor cause the processor to perform further acts of:

analyzing the one or more failure mode parameters that define a high-availability requirement of the multi-node computing cluster; and in advance of a failure event, determining that the then-current virtual machine placement configuration of the multi-node computing cluster does not satisfy the high-availability requirement.

3. The non-transitory computer readable medium of claim 1, wherein the first and second alternate feasible virtual machine placements satisfy (1) a first condition that all virtual machines that were running on a failed node can be placed across nodes of the cluster without adding additional hardware resources to the cluster, and (2) a second condition that placement of the virtual machines of the failed node onto surviving nodes satisfies the high-availability requirement.

4. The non-transitory computer readable medium of claim 1 further comprising instructions which, when stored in memory and executed by the processor cause the processor to perform further acts of: performing analysis of the first alternate feasible virtual machine placement and the second alternate feasible virtual machine placement, wherein the analysis comprises at least one of, a result of an optimization function, an optimization minimization objective, an optimization maximization objective, or a constraint.

5. The non-transitory computer readable medium of claim 4 wherein at least one of, the optimization function, the optimization minimization objective, the optimization maximization objective or the constraint comprises an amount of memory.

6. The non-transitory computer readable medium of claim 4 wherein at least one of, the optimization function, the optimization minimization objective, the optimization maximization objective or the constraint comprises a CPU resource demand.

7. The non-transitory computer readable medium of claim 4 wherein at least one of, the optimization function, the optimization minimization objective, the optimization maximization objective or the constraint comprises a determination of an amount of VM memory to be moved from one node to another node.

8. The non-transitory computer readable medium of claim 4 wherein at least one of, the optimization function, the optimization minimization objective, the optimization maximization objective or the constraint comprises a determination of headroom available on surviving nodes of the cluster.

9. A method comprising:

storing one or more failure mode parameters that define a high-availability requirement of a multi-node computing cluster, wherein the high-availability requirement comprises a requirement that one or more virtual machines on a respective node can be placed on one or more other nodes in the multi-node computing cluster in an event of a failure of the respective node;

executing a cluster monitor process that detects changes on the multi-node computing cluster; and analyzing, in response to a detection of a change on the multi-node computing cluster corresponding to the high-availability requirement, a then-current virtual machine placement configuration of the multi-node computing cluster to determine at least a first alternate feasible virtual machine placement and a second alternate feasible virtual machine placement that both satisfy the high-availability requirement in spite of failure of one or more nodes of the multi-node computing cluster, wherein:

the first alternate feasible virtual machine placement comprises a first number of VM migrations, the second alternate feasible virtual machine placement comprises a second number of VM migrations, and the first alternate feasible virtual machine placement is selected wherein the first number of VM migrations for the first alternate feasible virtual machine placement is less than the second number of VM migrations for the second alternate feasible virtual machine placement.

10. The method of claim 9, further comprising:

analyzing the one or more failure mode parameters that define a high-availability requirement of the multi-node computing cluster; and in advance of a failure event, determining that the then-current virtual machine placement configuration of the multi-node computing cluster does not satisfy the high-availability requirement.

11. The method of claim 9, wherein the first and second alternate feasible virtual machine placements satisfy (1) a first condition that all virtual machines that were running on a failed node can be placed across nodes of the cluster without adding additional hardware resources to the cluster, and (2) a second condition that placement of the virtual machines of the failed node onto surviving nodes satisfies the high-availability requirement.

12. The method of claim 9 further comprising: performing analysis of the first alternate feasible virtual machine placement and the second alternate feasible virtual machine placement, wherein the analysis comprises at least one of, a result of an optimization function, an optimization minimization objective, an optimization maximization objective, or a constraint.

13. The method of claim 12 wherein at least one of, the optimization function, the optimization minimization objective, the optimization maximization objective or the constraint comprises an amount of memory.

14. The method of claim 12 wherein at least one of, the optimization function, the optimization minimization objective, the optimization maximization objective or the constraint comprises a CPU resource demand.

15. The method of claim 12 wherein at least one of, the optimization function, the optimization minimization objective, the optimization maximization objective or the constraint comprises a determination of an amount of VM memory to be moved from one node to another node.

16. The method of claim 12 wherein at least one of, the optimization function, the optimization minimization objective, the optimization maximization objective or the constraint comprises a determination of headroom available on surviving nodes of the cluster.

17. A system comprising:
a storage medium having stored thereon a sequence of instructions; and
a processor that executes the sequence of instructions to cause the processor to perform acts comprising,
storing one or more failure mode parameters that define a high-availability requirement of a multi-node computing cluster, wherein the high-availability requirement comprises a requirement that one or more virtual machines on a respective node can be placed on one or more other nodes in the multi-node computing cluster in an event of a failure of the respective node;
executing a cluster monitor process that detects changes on the multi-node computing cluster; and
analyzing, in response to a detection of a change on the multi-node computing cluster corresponding to the high-availability requirement, a then-current virtual machine placement configuration of the multi-node computing cluster to determine at least a first alternate feasible virtual machine placement and a second alternate feasible virtual machine placement that both satisfy the high-availability requirement in spite of failure of one or more nodes of the multi-node computing cluster, wherein:
the first alternate feasible virtual machine placement comprises a first number of VM migrations,
the second alternate feasible virtual machine placement comprises a second number of VM migrations, and
the first alternate feasible virtual machine placement is selected wherein the first number of VM migrations for the first alternate feasible virtual machine placement is less than the second number of VM migrations for the second alternate feasible virtual machine placement.

18. The system of claim 17, further comprising instructions which, when stored in memory and executed by the processor cause the processor to perform further acts of:
analyzing the one or more failure mode parameters that define a high-availability requirement of the multi-node computing cluster; and
in advance of a failure event, determining that the then-current virtual machine placement configuration of the multi-node computing cluster does not satisfy the high-availability requirement.

19. The system of claim 17, wherein the first and second alternate feasible virtual machine placements satisfy (1) a first condition that all virtual machines that were running on a failed node can be placed across nodes of the cluster without adding additional hardware resources to the cluster, and (2) a second condition that placement of the virtual machines of the failed node onto surviving nodes satisfies the high-availability requirement.

20. The system of claim 17 further comprising instructions which, when stored in memory and executed by the processor cause the processor to perform further acts of: performing analysis of the first alternate feasible virtual machine placement and the second alternate feasible virtual machine placement, wherein the analysis comprises at least one of, a result of an optimization function, an optimization minimization objective, an optimization maximization objective, or a constraint.

21. The system of claim 20 wherein at least one of, the optimization function, the optimization minimization objective, the optimization maximization objective or the constraint comprises an amount of memory.

22. The system of claim 20 wherein at least one of, the optimization function, the optimization minimization objective, the optimization maximization objective or the constraint comprises a CPU resource demand.

23. The system of claim 20 wherein at least one of, the optimization function, the optimization minimization objective, the optimization maximization objective or the constraint comprises a determination of an amount of VM memory to be moved from one node to another node.

24. The system of claim 20 wherein at least one of, the optimization function, the optimization minimization objective, the optimization maximization objective or the constraint comprises a determination of headroom available on surviving nodes of the cluster.

25. A non-transitory computer readable medium having stored thereon a sequence of instructions which, when stored in memory and executed by a processor cause the processor to perform acts comprising:
storing one or more failure mode parameters that define a high-availability requirement of a multi-node computing cluster, wherein the high-availability requirement comprises a requirement that one or more virtual machines on a respective node can be placed on one or more other nodes in the multi-node computing cluster in an event of a failure of the respective node;
executing a cluster monitor process that detects changes on the multi-node computing cluster; and
analyzing, in response to a detection of a change on the multi-node computing cluster corresponding to the high-availability requirement, a then-current virtual machine placement configuration of the multi-node computing cluster to determine at least a first alternate feasible virtual machine placement and a second alternate feasible virtual machine placement that both satisfy the high-availability requirement in spite of failure of one or more nodes of the multi-node computing cluster, wherein:
the first alternate feasible virtual machine placement corresponds to a first value of a minimization objective,
the second alternate feasible virtual machine placement corresponds to a second value of the minimization objective, and
the first alternate feasible virtual machine placement is selected wherein the first value of the minimization objective is less than the second value of the minimization objective.

26. The non-transitory computer readable medium of claim 25, wherein the first value of the minimization objective corresponds to at least one of, an amount of memory, a number of VMs, or an amount of network bandwidth.

* * * * *